(12) United States Patent
De Kadt et al.

(10) Patent No.: US 10,698,767 B1
(45) Date of Patent: Jun. 30, 2020

(54) DECENTRALIZED MANAGEMENT OF MULTI-SERVICE WORKFLOWS

(71) Applicant: Amazon Technologies, Inc., Reno, NV (US)

(72) Inventors: Christopher Richard Jacques De Kadt, Seattle, WA (US); Marc Andrew Bowes, Western Cape (ZA); Jacobus Johannes Van Der Merwe, Western Cape (ZA); Andrew James Lusk, Western Cape (ZA); Jacob Adam Gabrielson, Seattle, WA (US); Robin Alan Golden, Western Cape (ZA); Michael Groenewald, Western Cape (ZA); James Alfred Gordon Greenfield, Western Cape (ZA)

(73) Assignee: Amazon Technologies, Inc., Seattle, WA (US)

( * ) Notice: Subject to any disclaimer, the term of this patent is extended or adjusted under 35 U.S.C. 154(b) by 275 days.

(21) Appl. No.: 14/579,742

(22) Filed: Dec. 22, 2014

(51) Int. Cl.
   *G06F 11/14* (2006.01)
   *G06F 16/23* (2019.01)

(52) U.S. Cl.
   CPC ...... *G06F 11/1446* (2013.01); *G06F 16/2315* (2019.01)

(58) Field of Classification Search
   CPC .................. G06F 11/1446; G06F 17/30351
   See application file for complete search history.

(56) References Cited

U.S. PATENT DOCUMENTS

| 7,127,716 | B2 | 10/2006 | Jin et al. |
| 7,792,693 | B2 | 9/2010 | Bultmeyer et al. |
| 7,908,311 | B2 | 3/2011 | O'Loughlin et al. |
| 8,019,849 | B1 | 9/2011 | Lopilato et al. |
| 8,209,213 | B2 | 6/2012 | Raisanen |
| 9,916,545 | B1 | 3/2018 | de Kadt et al. |
| 2004/0117798 | A1* | 6/2004 | Newman ............. G06F 9/44505 719/310 |

(Continued)

FOREIGN PATENT DOCUMENTS

| CN | 101184106 | 5/2008 |
| CN | 103365652 | 10/2013 |

(Continued)

OTHER PUBLICATIONS

Invitation to Pay Additional Fees for PCT/US2015/049470, dated Dec. 1, 2015, Amazon Technologies Inc., pp. 1-10.

(Continued)

*Primary Examiner* — Belix M Ortiz Ditren
*Assistant Examiner* — Dustin D Eyers
(74) *Attorney, Agent, or Firm* — Robert C. Kowert; Kowert, Hood, Munyon, Rankin & Goetzel, P.C.

(57) ABSTRACT

A service workflow agent associated with a particular service of a provider network identifies a repository in which workflow descriptors indicative of tasks to be performed by the service are stored. In response to determining that a modification has been applied at one such repository, the agent examines a particular workflow descriptor stored in the repository. The agent initiates an attempt to implement a first task indicated in the descriptor. Subsequently, the agent updates the descriptor in accordance with an optimistic concurrency control technique to indicate a status of the first task.

21 Claims, 12 Drawing Sheets

(56) References Cited

U.S. PATENT DOCUMENTS

| | | |
|---|---|---|
| 2005/0193103 A1 | 9/2005 | Drabik |
| 2005/0268298 A1* | 12/2005 | Hunt .................... G06F 9/4856 718/1 |
| 2006/0206903 A1* | 9/2006 | Lawrence ............... G06F 9/547 719/313 |
| 2006/0268742 A1 | 11/2006 | Chu et al. |
| 2007/0136385 A1* | 6/2007 | Abrashkevich ....... G06F 11/366 |
| 2007/0239987 A1 | 10/2007 | Hoole et al. |
| 2008/0028009 A1 | 1/2008 | Ngo |
| 2008/0034200 A1 | 2/2008 | Polcha et al. |
| 2008/0256548 A1* | 10/2008 | Branson ................ G06F 9/5072 718/106 |
| 2009/0077164 A1 | 3/2009 | Phillips et al. |
| 2009/0288084 A1 | 11/2009 | Astete et al. |
| 2009/0307530 A1* | 12/2009 | Tarta .................. G06F 11/3668 714/38.14 |
| 2010/0057826 A1 | 3/2010 | Chow et al. |
| 2010/0257138 A1 | 10/2010 | Wang et al. |
| 2010/0332448 A1 | 12/2010 | Holenstein et al. |
| 2011/0022694 A1 | 1/2011 | Dalal et al. |
| 2011/0055169 A1* | 3/2011 | Yalamanchi ........ G06F 16/2365 707/690 |
| 2011/0161391 A1 | 6/2011 | Araujo et al. |
| 2011/0276977 A1 | 11/2011 | van Velzen et al. |
| 2011/0282706 A1* | 11/2011 | Ezra ...................... G06Q 10/06 705/7.15 |
| 2012/0079490 A1 | 3/2012 | Bond et al. |
| 2012/0166407 A1 | 6/2012 | Lee et al. |
| 2014/0297355 A1* | 10/2014 | Ohashi ............ G06Q 10/06316 705/7.26 |
| 2014/0304380 A1 | 10/2014 | Waas et al. |

FOREIGN PATENT DOCUMENTS

| | | |
|---|---|---|
| EP | 1713231 | 10/2006 |
| JP | H06243072 | 9/1994 |
| JP | H09204341 | 8/1997 |
| JP | 2004518335 | 6/2004 |
| JP | 2010152559 | 7/2010 |
| JP | 2011076487 | 4/2011 |

OTHER PUBLICATIONS

Ozgur Ulusoy, "Processing Real-Time Transactions in a Replicated Datebase System", Distributed and Parallel Datebases, vol. 2, No. 4, Sep. 10, 1993, pp. 405-436.

Philip A. Bernstein, et al., "Concurrency Control and Recovery in Database Systems", Retrieved from the Internet URL: https://courses.cs.washington.edu/courses/cse490h/11wi/CSE490H_files/CSE550BHG-Ch7.pdf, Jan. 1987, pp. 1-58.

International Search Report and Written Opinion, dated Dec. 7, 2015, Amazon Technologies, Inc., pp. 1-11.

U.S. Appl. No. 14/753,475, filed Jun. 29, 2015, Allan Henry Vermeulen, et al.

U.S. Appl. No. 14/753,484, filed Jun. 29, 2015, John Michael Morkel, et al.

U.S. Appl. No. 14/753,495, filed Jun. 29, 2015, Timothy Daniel Cole, et al.

U.S. Appl. No. 14/753,505, filed Jun. 29, 2015, Allan Henry Vermeulen, et al.

U.S. Appl. No. 14/316,622, filed Jun. 26, 2014, Allan Henry Vermeulen.

"Blackboard System", Wikipedia, accessed Dec. 3, 2014, pp. 1-5.

* cited by examiner

DECENTRALIZED MANAGEMENT OF MULTI-SERVICE WORKFLOWS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine can be thought of as a software simulation acting as a distinct logical computing system that provides users with the illusion that they are the sole operators and administrators of a given hardware computing resource, while also providing application isolation among the various virtual machines.

Over time, many fairly advanced features and capabilities have been added to the virtualized computing servers (also known as compute instances) offered at some provider networks. For example, it may be possible for a client to select different types of backing storage devices (e.g., local versus off-host storage), desired levels of network isolation (e.g., some compute instances may be configured within isolated virtual networks whose internal networking configuration can be controlled largely by the client), various levels of security, different types of pre-configured software stacks, and so on. In order to set up a given compute instance with a complex combination of properties selected by a client, and/or to perform any of various types of operations using the compute instances, a number of internal services of the provider network (such as capacity management services, storage services, network configuration services, security-related services and the like) may have to work together to implement numerous potentially inter-dependent tasks. In at least some scenarios, the use of a centralized coordinating entity or service responsible for managing complex multi-service workflows may result in operational inefficiencies at the provider network. For example, the coordination logic may become too unwieldy to be easily debugged, the coordinator may become a performance bottleneck, or the engineering team implementing the coordinator may become an organizational bottleneck when changes to workflow logic have to be implemented.

Figure 1:
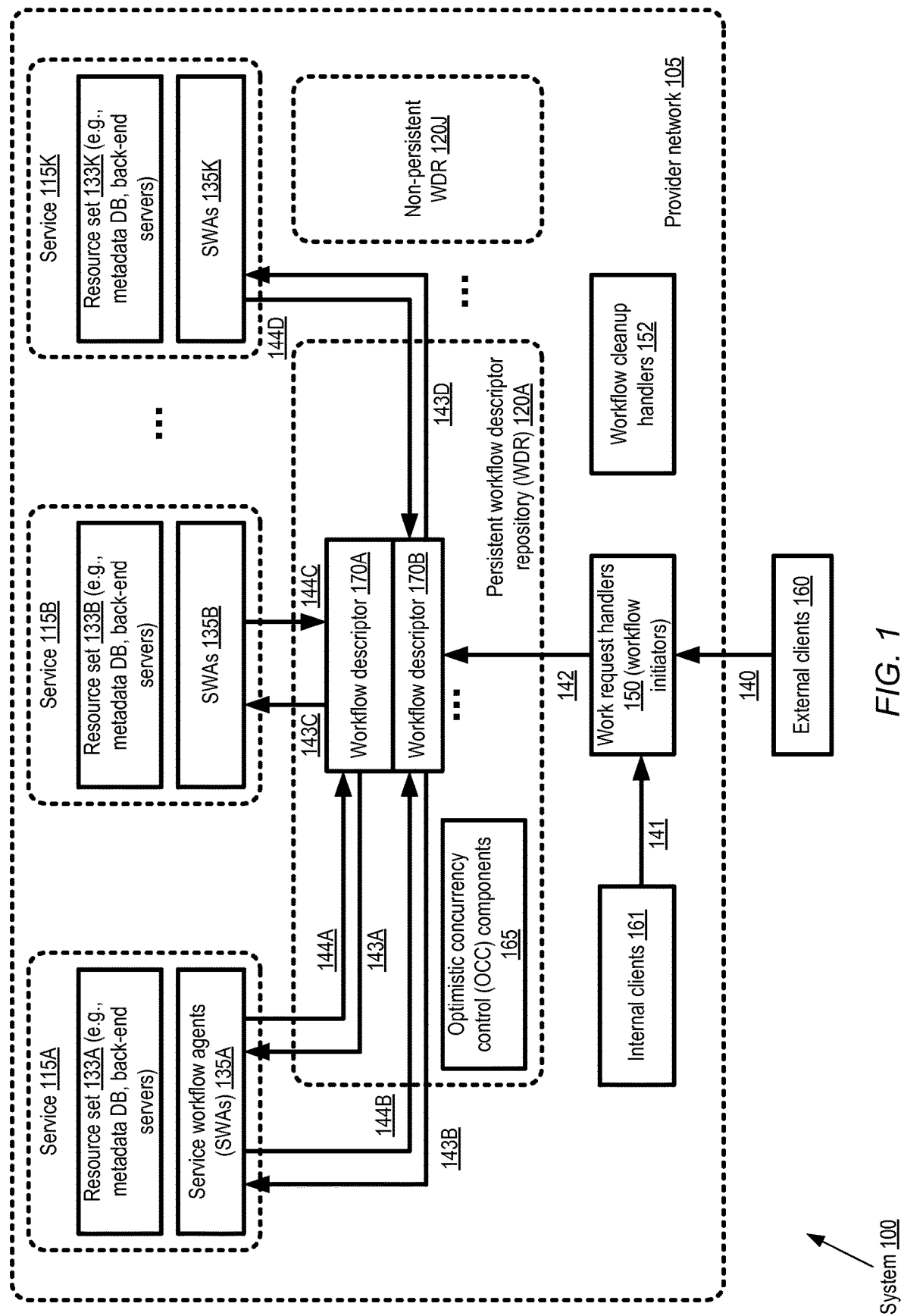
FIG. 1 illustrates an example system environment in which multi-service workflows of a provider network may be managed in a decentralized fashion using workflow descriptors accessible by a plurality of service workflow agents using an optimistic concurrency control mechanism, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing decentralized management of multi-service workflows at provider networks are described. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. Some provider networks may also be referred to as "public cloud" environments. The term "multi-tenant service" may be used herein to refer to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. For example, a multi-tenant virtualized computing service (VCS) may instantiate several different guest virtual machines on behalf of respective clients at a given hardware server, without any of the clients being informed that the hardware server is being shared with other clients. Guest virtual machines may also be referred to as "compute instances" or simply as "instances" herein, and the hardware servers on which one or more instances are resident may be referred to as "virtualization hosts" or "instance hosts". A provider network may typically include several large data centers hosting various resource pools, such as collections of physical and/or virtualized computer servers, storage devices, networking equipment, security-related equipment and the like, needed to implement, configure and distribute the infrastructure and services offered by the provider.

In order to implement the services (such as a VCS) that are used by external clients, a number of internal services may have to be implemented in a provider network in at least some embodiments. For example, in order to set up a given compute instance, the VCS may have to utilize one or more internal capacity services to determine whether sufficient resources are available at a data center that can be used for the compute instance, internal storage services to allocate the type and amount of storage (e.g., storage volumes of a specified size accessible via a block-level interface) needed for the instance, internal network services to establish connectivity for the instance (e.g., by assigning one or more public or private IP (Internet protocol) addresses), security-related services (e.g., to ensure that only the appropriate types of operations are permitted by the appropriate set of users or groups), and so on. To respond to many of the different types of work requests that may be received at a provider network, such as a request to launch a compute instance with a selected set of properties, or a request to replicate a specified data set across multiple data centers, a fairly complex set of tasks may have to be performed with the help of several internal services in some embodiments.

In at least some embodiments, instead of relying on any one service or entity to coordinate such complex workflows, a decentralized workflow management technique involving the use of workflow descriptors that can be accessed independently and/or asynchronously from the different internal services may be employed. The provider network operator may establish some set of work request handlers (WRHs), such as front-end nodes of a VCS, to receive work requests of one or more types from external or internal clients, and to generate and store workflow descriptors corresponding to the work requests. Work request handlers may also be referred to herein as workflow initiators. External clients may, for example, comprise software and/or hardware components resident at customer-owned networks, while internal clients may comprise software and/or hardware components that are located within the provider network's own data centers. In some embodiments, a fleet of WRHs may be dedicated to handle client interactions associated with a given service such as the VCS, while in other embodiments a given WRH may be configurable to respond to a variety of work request types of several different services. A number of different types of programmatic interfaces may be used by internal and/or external clients to submit the work requests to the WRHs in different embodiments, such as application programming interfaces (APIs), web pages including web-based consoles, command-line tools, and/or graphical user interfaces (GUIs).

Upon receiving a work request, a WRH may perform one or more operations to validate the request in some embodiments, such as a syntax check in the case of an API invocation, and/or some level of authentication and/or authorization checks. If the request is accepted for processing, the WRH may determine whether a workflow descriptor is needed for the set of operations needed to fulfill the request. For example, some requests may be simple enough that they can be handled by a single back-end server (or even by the WRH itself), and therefore the overhead of establishing a workflow descriptor may be unnecessary for such requests. If the WRH determines that a workflow descriptor is to be generated, a target repository or storage location for the descriptor may be identified. In some embodiments, for example, at least two categories of repositories may be implemented for workflow descriptors: persistent repositories (in which a given workflow descriptor may be stored at one or more disk-based storage devices or other storage devices offering non-volatile memories) and non-persistent repositories (in which a workflow descriptor may only have to be stored in volatile memory at one or more hosts or servers). The type of repository to be used and/or the particular repository to be used may be selected on the basis of any of a variety of factors in different embodiments—for example, the repository may be chosen based on the number of different services that are expected to participate in responding to the request, the expected time it may take to perform the work corresponding to the request, the identity of the client from which the request was received, current workload conditions in the provider network, and so on.

After a WRH selects a particular repository, one or more workflow descriptors corresponding to the work request may be stored therein. In some embodiments and for some types of work requests, the WRH may simply store a high-level summary of the requested work—e.g., "Make N replicas of data object DO1 with 99.999999% data durability" or "Launch a compute instance with a compute capacity=CC1, backed by a volume of size X GB, with one public IP address". In other embodiments, the WRH may generate at least a preliminary list of lower-level tasks that are to be performed to respond to the work request, and store each element of the list as a separate entry in the workflow descriptor.

In some embodiments, respective service workflow agents (SWAs) associated with some or all of the services that are implemented at the provider network may be configured to detect changes to the workflow descriptor repositories. The SWAs of different services may operate independently of, and asynchronously with respect to, each other in at least some embodiments; in fact, a given SWA of a particular service may not necessarily have any information pertaining to any other SWA. By examining the modifications to the repository, an SWA may identify particular workflow tasks (indicated by or in the workflow descriptors stored at the repositories) that can be performed by the corresponding service. The SWA may then initiate attempts to perform the tasks at the service, and may later update the workflow descriptors to indicate the status of the tasks (e.g., the success or failure of the attempts). In at least one embodiment, an optimistic concurrency control (OCC)

mechanism may be used to manage the creation of and updates to workflow descriptors in the repository. For example, a service workflow agent may transmit a transaction request to a conflict detector of the OCC mechanism, indicating that a task status field in a particular workflow descriptor is to be updated. The transaction request may include a read set and/or a committed state identifier (such as a commit sequence number) of the repository in some embodiments. The read set may list repository objects (such as other workflow task entries, or other workflow descriptors) on which the requested update depends, while the committed state identifier may indicate the most-recent committed state of the repository as of the time that the service agent generated the transaction request. If the conflict detector determines that the read set has not been modified (e.g., by any other service workflow agent) since the state indicated by the committed state identifier was reached, the transaction may be accepted for commit. Replicas of the status update may be stored at a plurality of nodes of a replication DAG (directed acyclic graph) in some embodiments. Further details regarding the working of OCC mechanisms that may be used in various embodiments are provided below. The use of the OCC may allow changes to workflow status to be shared among various SWAs without requiring centralized lock management or complex two-phase commit procedures in at least some embodiments.

In at least one embodiment, a workflow descriptor may include a field that represents the status of the workflow as a whole, in addition to individual status fields used to indicate the status of respective tasks that are part of the workflow. In one such embodiment, some or all of the participant SWAs that are involved in implementing a given workflow may be able to request two types of status updates to a workflow descriptor: a task-level status update or a workflow-level status update. With respect to task-level status, an SWA may be able to indicate whether the task has been completed successfully, or whether the task has failed. With respect to the workflow-level status, in some embodiments, an SWA may be permitted to indicate that the workflow as a whole is to be abandoned or aborted—for example, due to the fact that a task that was an essential or required component of the workflow has failed or could not be completed. Thus, for example, consider a scenario in which a given workflow descriptor WD1 indicates three tasks T1, T2 and T3, respectively handled by SWAs SWA1, SWA2 and SWA3 of services Svc1, Svc2 and Svc3. Assume that the semantics of the work request require all three tasks to be completed (in any sequence) for the workflow to be considered complete. Independently and/or asynchronously with respect to SW2 and SW3, SW1 may detect the modification to the repository corresponding to the insertion of WD1, recognize T1 as a task that can be performed at Svc1, and may initiate the required operations to perform T1. SW1 may eventually update WD1 to indicate that T1's status is "Complete". Similarly, independently of SW1 and SW3, SW2 may recognize T2 as a task that can be completed at Svc2, and may initiate the required operations at some set of Svc2 resources. When T2 is completed, its status may be set to "Complete" in WD1 by SWA2. SW3 may identify T3 as a task that should be performed at Svc3, and may initiate the corresponding operations using Svc3 resources.

If T3 fails (or if SWA3 is able to determine that T3 is not feasible or will not be completed in a reasonable amount of time), SWA3 may simply update the overall status of WD1 to "Aborted" in some embodiments. Such a change to WD1 may be detected by SWA1 and SWA2 (both of which were configured to detect modifications to the repository), which may then begin the process of rolling back or undoing T1 and T2 in some embodiments. If some changes had been performed at Svc3 (as part of T3), such changes may also be rolled back or undone if T3 as a whole cannot be completed. Any operations that have been completed for T1, T2 or T3 may be undone so that the changes associated with the workflow as a whole are implemented atomically in such embodiments: that is, either all the changes corresponding to the tasks of the workflow are completed, or none of the changes are made persistent.

The abort or cancellation of the workflow as a whole may be initiated by any of the participating services or SWAs in at least some embodiments. In contrast, in at least one embodiment, a workflow need not be explicitly committed as a whole. Instead, in such an embodiment, each task's status may be set to "Complete" when the corresponding operations succeed, and when all the tasks indicated in the workflow descriptor are completed, the workflow as a whole may be considered complete. In other embodiments, in contrast, another component of the workflow management system such as a cleanup agent (or a particular SWA that happens to be the agent whose task is the last one of the workflow to be completed) may mark a workflow descriptor's overall status as complete if all the underlying tasks have been completed. In at least one embodiment, each workflow descriptor may have an explicit or implicit timeout setting, indicating a maximum amount of time that is to elapse by which the workflow's tasks are to be completed. In such a scenario, a cleanup agent (or an SWA) may detect that a given workflow's timeout has expired and one or more tasks have not been completed, in which case the workflow may also be aborted or abandoned. In at least one embodiment, the entity that submitted the work request for which a workflow descriptor was generated may eventually be explicitly notified that the work request has been fulfilled—e.g., by a cleanup agent or a completion checker component of the workflow management system which has confirmed that no uncompleted tasks remain in the workflow descriptor corresponding to the work request.

In various embodiments, the SWAs may perform other types of updates to workflow descriptors than task status updates or workflow-level status updates. In some embodiments in which the WRH does not generate and store a list of tasks, and simply includes a high-level summary of the requested work, one or more SWAs may modify the workflow descriptor by adding tasks—that is, the job of translating a high-level work request to more specific underlying tasks may be performed by one or more SWAs. In at least some embodiments, even if the WRH stores a list of tasks in a workflow descriptor, an SWA may examine a particular task entry, and replace it with one or more other task entries that appear to be more appropriate than the particular task generated by the WRH. In some implementations, upon examining a given task indicated in a workflow descriptor, or as a result of the implementation of a given task at the corresponding service, an SWA may determine that an additional set of one or more tasks (to be performed at other services or at the SWA's own service) are required, and may add such tasks to the workflow descriptor. Thus, in general, at least some SWAs may be able to add and/or remove tasks from workflow descriptors in various embodiments. Such additions or removals may be considered an indirect mechanism for SWAs to communicate with one another.

One advantage of such a decentralized approach to workflow management is that a WRH need not be aware of, or familiar with, the details of how different tasks are to be performed at the different services involved in a given workflow, or of dependencies between the tasks. Instead, the WRH may simply store some representation of the required work corresponding to a work request in a workflow descriptor, and the SWAs may be responsible for detecting when work for their services has been requested, identifying dependencies on other tasks or other services, and scheduling operations when their dependencies have been met. If a particular SWA responsible for a task T1 determines, e.g., by examining the workflow descriptor status entry for a different task T2 which is a pre-requisite for T1, that T1 cannot yet be started (or completed), the SWA may simply defer the scheduling of T1's operations until a subsequent update to T2's status indicates that the pre-requisites for T1 have been completed. If T2 fails (as may also be detected via T2's status field in the workflow descriptor), the SWA may abandon or abort T1.

Another advantage of the decentralized approach is that in at least some embodiments, each of the SWAs may access workflow information (e.g., new tasks, task status, workflow status, etc.) from the workflow repository without passing through other services—that is, no intermediaries may be involved in the communication of workflow-related information. Consider an alternative scenario in which operations at two services Svc1 and Svc2 are to be performed to respond to a given work request. If the information about the work required flows to Svc2 via Svc1, then changes to the implementation (e.g., as a result of a new software version or release) of Svc2 may require changes to the implementation of Svc1 in order to assure the continued smooth flow of workflow information. Instead, if respective SWAs SWA and SWA2 are set up for the different services and the decentralized approach described above is used, changes at Svc1 may not be required when Svc2 (or SWA2) is modified at least in some embodiments. The use of independent, asynchronously-operating SWAs thus avoids the cascading effects of software changes. This may be particularly beneficial when different software teams are involved in implementing the respective services. If a more traditional approach involving a chain of communications between multiple services were used, the different software teams may have to coordinate their schedules to make sure that all the member services of the chain can accommodate changes made at any one of the services.

At least some of the tasks that may be performed in response to a client's work request may involve the allocation of resources—for example, a storage volume to be used for a file system of a compute instance may be created in response to a client request to launch the instance. Under some types of failure scenarios, resource allocation tasks may potentially lead to resource "leakage" (for example, storage may be allocated from a pool without being fully configured as intended, preventing the eventual release of the storage and shrinking the available pool space over time). Consider a scenario in which an SWA (SWA1) issues a request to a back-end component of a storage service to create a volume to be used for a file system of a compute instance that is to be launched. The back-end component may begin allocating storage for the volume, and either the back-end component or SWA1 (or both) may fail before the volume is fully configured. Depending on the timing of the failure, storage consumed by the back-end component for the volume may sometimes represent a "leak", as there may not be an easy way to refer to the storage that was consumed, to query its status, or to use it for its intended purpose. In order to eliminate (or at least reduce the likelihood of) resource leakages, a number of different leakage prevention techniques and mechanisms may be used in different embodiments. In one embodiment, for example, a multi-step procedure may be used for setting up resources such as storage volumes. In a first step, before a resource object (e.g., a volume of X gigabytes) needed by an agent SWA1 is allocated, an identifier for the object may be generated (e.g., by a different SWA such as SWA2). The generation of the identifier may be designated as a prerequisite for the allocation of the corresponding physical resources; that is, the allocation may be treated as a separate second step. SWA1 may thus only be able to request the allocation of the resource using the identifier, i.e., after an identifier has been successfully created. Thereafter, even if SWA1 or some other component involved in setting up the resource fails, the identifier may be used to query the status of the resource, so the probability of losing track of consumed resources is diminished. Another advantage of separating the generation of a resource object identifier from the consumption of the underlying physical resources is that multiple requests for creating the same object may be handled in an idempotent manner, without consuming additional underlying resource each time. For example, if a request to create a volume with identifier V1 is received from an agent SW1, and then the same request for V1 is received later from a replacement agent SWk that has taken over SW1's responsibilities after SW1 fails, no new storage space may be used in response to the second request. Other types of failure handling techniques appropriate for managing complex workflows in a distributed and decentralized environment, including other alternatives for resource leakage prevention, may be used in some embodiments.

The decentralized approach towards managing complex workflows described above may be implemented for a variety of different types of work requests. Such requests may include, for example, compute instance launch requests as discussed above, storage replication or distribution requests, machine learning job requests, and so on. In some embodiments, any of various tasks that may require resources of one or more services may be handled using the same types of workflow descriptors. As described above, the kinds of repositories used may vary depending on factors such as the expected duration of the operations. In one embodiment, a variety of API invocations or other programmatic requests that may be submitted by internal or external clients may be handled using SWAs and a workflow descriptor repository, regardless of the relative complexity of the operations involved. In-memory repositories may be used, for example, for more immediate tasks that require synchronous or near-synchronous responses, while persistent repositories may be used for longer or more complex tasks. In at least one embodiment, a different concurrency control mechanism than optimistic concurrency control may be used for managing at least a subset of the updates to a workflow descriptor repository.

Example System Environment

FIG. 1 illustrates an example system environment in which multi-service workflows of a provider network may be managed in a decentralized fashion using workflow descriptors accessible by a plurality of service workflow agents using an optimistic concurrency control mechanism, according to at least some embodiments. As shown, system 100 includes a provider network 105 in which a plurality of network-accessible services 115 are implemented. Some of the services (such as a virtualized computing service that provides compute instances to clients, or various types of storage services including volume allocation services) may be exposed to clients outside provider network 105, such as external clients 160 and may or may not be used by internal clients 161 (e.g., hardware and/or software components that are implemented within the provider network). Other services may not be invoked from outside the provider network 105, and may be used only by internal clients 161. Services 115 may include, for example, in addition to the VCS and storage services mentioned above, numerous networking-related services (such as a network interface service), placement services to help map virtualized entities to hosts, a machine image service to provide images to be used for compute instances, various types of security-related services, and so on. In the depicted embodiment, each service 115 may include a respective resource set 133 (e.g., resource set 133A of service 115A, resource set 133B of service 115B, and resource set 133K of service 115K) at which the business logic of the service is implemented. Resource sets 133 may include, for example, back-end servers, service-specific metadata repositories, and so on. In addition, each service 115 may include one or more service workflow agents (SWAs) 135, such as SWAs 135A of service 115A, SWAs 135B of service 115B and SWAs 135K of service 115K. The SWAs 135 may interact with one or more workflow descriptor repositories WDRs implemented at the provider network 105, such as a persistent WDR 120A or a non-persistent WDR 120J, to identify tasks that are to be implemented using the corresponding resource sets 133, and to update the workflow descriptors in the repositories as needed as described below. In some embodiments each SWA may comprise one or more threads of execution, or one or more processes. Multiple SWAs of a given service 115 may be implemented on the same hardware server in at least some embodiments. The service 115 associated with an SWA may be referred to herein as the "parent service" of the SWA—e.g., service 115A may be referred to as the parent service of SWAs 135A, service 115B may be referred to as the parent service of SWAs 135B, and so on.

Work requests that require operations to be performed at various combinations of the services 115 may be submitted by internal clients 161 and/or external clients 160 in the depicted embodiment. As indicated by arrows 140 and 141, such work requests may be directed to, or intercepted by, a set of front-end components called work request handlers (WRHs) 150 in some embodiments. WRHs 150 may also be referred to herein as workflow initiators. In some embodiments, a respective set of WRHs 150 may be set up for each service 115 that is exposed to external clients and/or to internal clients, while in other embodiments, a shared fleet of WRHs may be used for a plurality of services and a plurality of work request categories. Each WRH may comprise one or more threads of execution or one or more processes in various embodiments. In some embodiments, client requests directed to a network endpoint (e.g., an IP address or a URI (Uniform Resource Indicator)) associated with a given service may be directed to one or more WRHs set up for the service.

In response to receiving a work request, a WRH 150 may perform one or more validation operations in the depicted embodiment, such as syntax checking, at least a preliminary level of authentication and/or authorization, and so on. The WRH may make a determination whether the work request warrants the creation of a workflow descriptor 170 (e.g., 170A, 170B, . . . , ), or if the requested work is straightforward enough to be performed without a need for a workflow descriptor. If a workflow descriptor is not required, the work request may be transmitted to one or more of the services 115 (e.g., either directly to a back-end resource of the service or via an intermediary such as an SWA).

If a workflow descriptor is to be used, the WRH may select a target repository 120 and then store a descriptor 170 therein, as indicated by arrow 142. A workflow descriptor 170, which may include entries for a plurality of tasks that collectively are to be completed in response to the work request in some embodiments, may be used by various service workflow agents 135 to discover the subset of the work that is to be performed at their respective service. The SWAs 135 may generate and store updates in the workflow descriptors 170 about the status of the work being performed at the SWA's services; such updates may be performed in a decentralized manner that does not require centralized coordination or two-phase commit operations. In some embodiments, resource leakage prevention techniques (such as the separation of resource identifier generation from the actual allocation of resources, as described above) may be used for at least some types of tasks. In the depicted embodiment, no centralized authority need necessarily be aware of the details of how different tasks of a given workflow descriptor are to be performed, or about dependencies across tasks. Workflow descriptors whose operations are expected to take a non-trivial amount of time, involve numerous services 115, or are considered sufficiently important based on some set of criteria of the WRH may be stored in a persistent WDR such as 120A. For example, in some embodiments, a log-structured repository may be used for such workflow descriptors, where changes to the state of a given descriptor may be replicated at several nodes of a persistent log before the changes are considered committed or complete. In at least some embodiments, changes to the workflow descriptor repositories may be coordinated using an optimistic concurrency control (OCC) mechanism. The OCC mechanism may be implemented using one or more components 165 in some embodiments, such as a conflict detector and one or more write appliers, as described below in further detail. For some workflow descriptors, e.g., those whose operations are expected to be completed either synchronously or in a short amount of time, a non-persistent repository such as 120J may be chosen. In at least some embodiments in which non-persistent repositories are implemented, OCC may be used at the non-persistent repositories as well. In some embodiments, OCC techniques may not be used, either at the persistent WDRs, at non-persistent WDRs, or at both types of repositories.

In at least some embodiments, the WDRs 120 may enable entities such as the SWAs 135 to subscribe as listeners, so that for example notifications of committed changes to specific subsets (or any) of the repository objects may be automatically provided to interested entities. In one embodiment, for example, each of the SWAs 135A, 135B, . . . , 135K may programmatically inform the WDR 120A about one or more types of workflow descriptors that are relevant to their respective services 115, where each type of workflow descriptor corresponds to a corresponding type of client request. As a result, each SWA 135 may subsequently be notified when a workflow descriptor 170 of the specified type indicated by the SWA is added to a repository such as 120A and/or when such a workflow descriptor is modified or deleted. Such notifications are indicated in FIG. 1 using arrows 143A, 143B, 143C and 143D. As shown, SWAs 135A may be notified about changes associated with workflow descriptors 170A (arrow 143A) and 170B (arrow 143B), SWAs 135B may be notified about changes associated with workflow descriptor 170A (arrow 143C), while SWAs 135K may be notified about changes associated with workflow descriptor 170B (arrow 143D). In some embodiments, the SWAs may pull information about the changes at a repository 120, e.g., using any of various types of polling techniques, instead of or in addition to obtaining update notifications that are pushed by the repositories. In at least some embodiments, an SWA may be configured to learn (either via push techniques, pull techniques or some combination of push and pull techniques) about all the changes that are committed at the repositories of interest, and may selectively react to the particular subset of changes that affect its parent service 115.

Upon detecting that a change has occurred at a repository 120, an SWA 135 may examine the repository contents (e.g., one or more descriptors 170 that have changed or been inserted) and respond in one of several ways. It may be the case, for example, that a new workflow descriptor has been added, for which some set of operations are to be performed at the SWA's parent service 115, or a new task for which operations can be performed at the parent service has been added to an existing workflow. In such a scenario, an SWA 135 may initiate the appropriate set of operations, e.g., by communicating with the resource set 133 of the service. The SWA may then monitor the progress of the operations it has initiated. Eventually, the operations may either succeed, or at least some subset of the operations may fail. An SWA 135 may update the workflow descriptor 170 to indicate the result of its attempted operations in the depicted embodiment, e.g., by setting a task status flag to "Completed" in the workflow descriptor. Such updates are indicated by arrows 144 in FIG. 1: e.g., an SWA 135A's updates 144A may be directed to workflow descriptor 170A, and updates 144B may be directed to workflow descriptor 170B. Similarly, arrow 144C indicates updates from an SWA 135B directed to workflow descriptor 170A, and arrow 144D indicates updates from an SWA 135K directed to workflow descriptor 170B.

In some embodiments in which optimistic concurrency control is used, a set of one or more updates from an SWA may be transmitted in a transaction request to a conflict detector, together with an indication of a read set on which the updates depend and an indication of a most recent committed state of the repository 120 known to the SWA at the time the transaction request was generated. Based at least in part on an examination of the metadata contained in the transaction request (e.g., the committed state information and/or the read set), and at least in part on changes that have been committed to the repository, the conflict detector may determine whether the requested updates are to be accepted for commit, or rejected. For example, the status updates may have been made by the SWA on the assumption that the read set (which may include the status of other tasks of the same workflow descriptor, or the status of other workflow descriptors) has not changed since the last committed state. If the conflict detector is able to determine that the read set has changed (or at least that there is a high probability that the read set has changed), the transaction request may be rejected. In the latter scenario, the source SWA that submitted the transaction request may examine the now-modified read set, and determine whether the submitted update can be resubmitted, or whether some different operations are required. If the conflict detector can confirm that the read set has not changed, the submitted updates to the workflow descriptor may be applied (e.g., by replicating the changes at several nodes of a directed graph), and other SWAs may be informed of the changes committed at the repository as a result of the updates.

It may be the case that an SWA 135 determines that the operations initiated by it at its parent service 115 on behalf of a given workflow descriptor 170 have failed, or are not going to succeed (e.g., due to a lack of sufficient resources). In such a scenario, in at least some embodiments, an SWA 135 may initiate the abandonment or rollback of the entire workflow, e.g., by updating the status of the workflow descriptor to "Aborted". In such a scenario, at least some of the operations that were performed for the now-aborted workflow descriptor 170 may have to be undone by the corresponding SWAs—e.g., if SWA 135B changes workflow descriptor 170A's state to "Aborted", SWA 135A may have to undo operations for another task of the same workflow that have already been begun or been completed at service 115A. In some embodiments, at least some of the tasks of a given workflow descriptor may be optional, so that a failure of a given task to complete does not necessarily require the abandonment of other tasks of the same workflow.

In at least some embodiments, a given SWA 135 may be able to add tasks to an existing workflow descriptor 170, or even to add new workflow descriptors 170 to one or more repositories. For example, an SWA 135A may determine, after it has completed some set of actions responsive to a task T1 of workflow descriptor 170A, that an additional task Tk needs to be performed, and may submit a transaction request to add Tk to the descriptor. In various embodiments, the SWAs may be responsible for determining dependencies between tasks of a given workflow or across workflows, and deferring operations at their parent services until the appropriate pre-requisites have been completed. Of course, if an SWA is able to determine that a pre-requisite task has failed, it may abandon one or more dependent tasks that were to be scheduled at its parent service in various embodiments.

In some embodiments, an SWA may be able to determine, e.g., after its request to change the status of a given task of a descriptor 170 to "Complete" is accepted, that none of the tasks of that workflow remain incomplete. In such a scenario, the SWA may be able to set the status of the whole workflow corresponding to the descriptor 170 is "Complete". In some embodiments, in response to a determination that all the work corresponding to a given workflow descriptor is complete, the requesting client 160 or 161 may be notified that the work request which led to the creation of the descriptor has been fulfilled. In other embodiments, clients need not necessarily be notified when their work requests are completed. Instead, for example, a client may be able to query the appropriate service to determine the status of their work request. In the case of a client's request to launch an instance, for example, an immediate or near-immediate response may be provided to indicate an identifier of the proposed instance and a "pending" state of the instance. The client may continue to check on the state of the instance (e.g., by clicking on a web link associated with the instance identifier), and the instance state (e.g., "pending", "active" or "failed") may be provided in response to the client's requests.

In the embodiment depicted in FIG. 1, one or more workflow cleanup handlers 152 may be established, for example to ensure that workflows that have not completed in reasonable amounts of time are rolled back or aborted. For example, at least some of the workflow descriptors 170 may have explicit or implicit timeout settings associated with them, such that if all of a given workflow's tasks are not complete by the timeout, the workflow as a whole is to be aborted. A workflow cleanup handler 152 may be responsible for periodically checking WDRs 120 for such timed-out or hung workflows, and may set the status of the corresponding workflow descriptors to "Aborted" so that the SWAs that initiated other tasks of the workflows can undo or roll back the other tasks.

Figure 2:
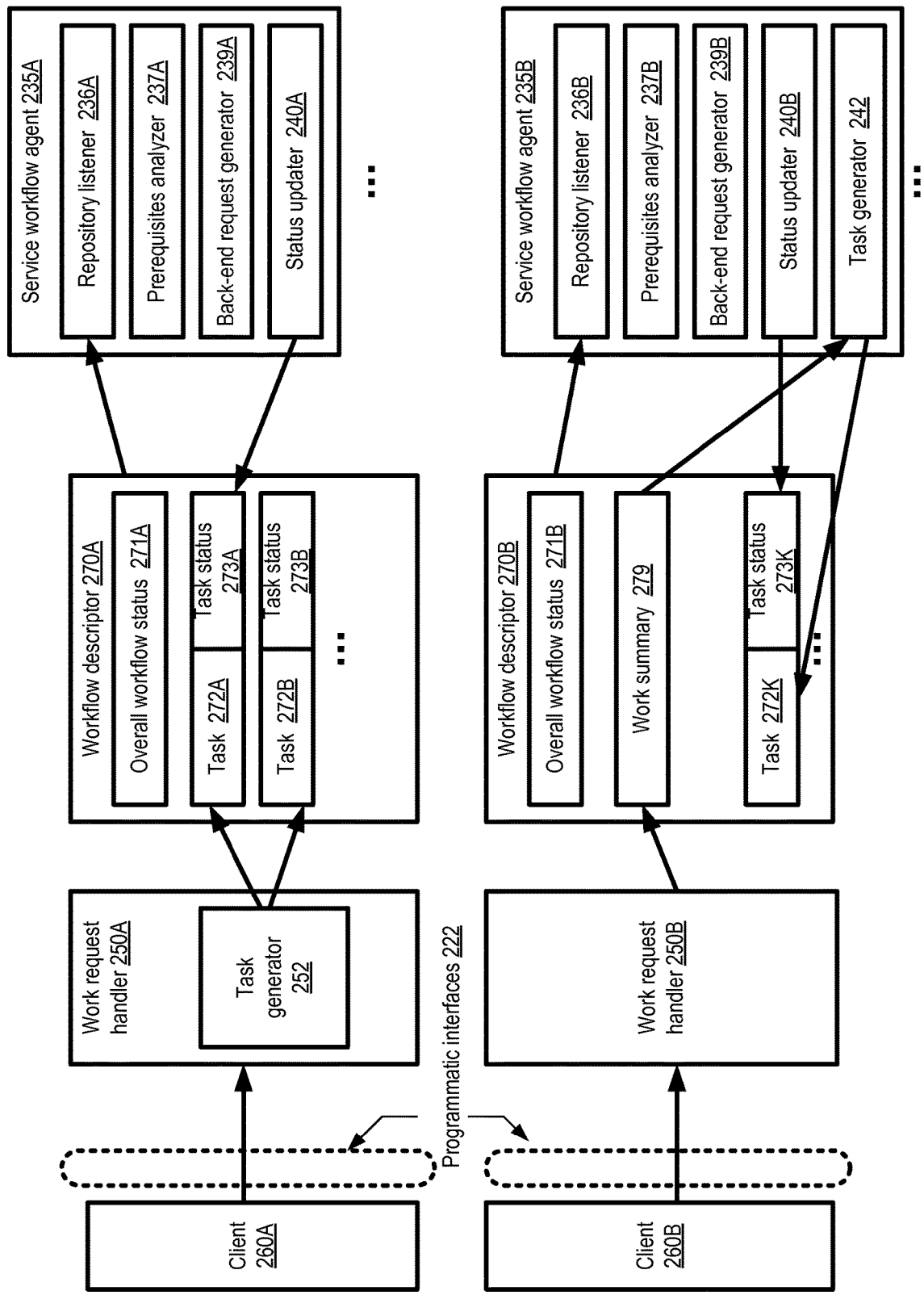
FIG. 2 illustrates example interactions between clients, work request handlers and service workflow agents, according to at least some embodiments.

Interactions Between Clients, Work Request Handlers and Service Workflow Agents FIG. 2 illustrates example interactions between clients, work request handlers and service workflow agents, according to at least some embodiments. As shown, clients 260A and 260B may submit respective sets of work requests via programmatic interfaces 222 of one or more provider network services. Some requests may be submitted form computing devices external to the provider network, while others may be submitted from within the provider network. Different services of the provider network may expose respective sets of programmatic interfaces 222 for internal and/or external clients, such as various APIs, consoles, web pages, command-line tools and the like. A number of different types of front-end work request handlers (WRHs) 250 may be configured in different embodiments to receive the client-submitted work requests. Some WRHs, such as 250A, may include a task generator 252 configured to translate or transform a given client work request into a list of lower-level tasks such as task 272A and 272B in the depicted embodiment. The task list may be included in a corresponding workflow descriptor 270A created on behalf of the client by the WRH. The workflow descriptor 270A may include an overall workflow status field 271A, as well as individual task-level status fields such as 273A and 273B in the depicted embodiment.

A repository listener component 236A of a service workflow agent 235A affiliated with a particular network-accessible service of the provider network (e.g., either a service that is used primarily within the provider network by other services, or an externally advertised service) may determine that the workflow descriptor 270A has been stored at a repository. Any of a number of different techniques may be used by repository listener in various embodiments to keep track of the changes at the repository, such as polling-base techniques or automated notifications via subscriptions. The repository listener 236A may also identify one or more specific tasks, such as task 272A, that can be completed at the SWA's parent service in the depicted embodiment. In other embodiments, other subcomponents of an SWA may be responsible for identifying the tasks that can be performed by the parent service.

Prerequisites analyzer 237A of SWA 235A may be responsible for determining whether any other tasks or operations have to be completed before task 272A can be begun or completed. For example, it may be possible to start operations corresponding to task 272A without waiting for a prerequisite task to complete, but it may not be feasible to complete task 272A unless the other task succeeds. Back-end request generator 239A may generate the internal requests corresponding to task 272A (e.g., after any prerequisites have been completed) and transmit them to other resources of the parent service of SWA 235A in the depicted embodiment. After the operations corresponding to task 272A are completed, the status updater 240A may generate the transaction request needed to update task 272A's status in the repository. If the operations corresponding to task 272A fail or cannot be completed, in some embodiments status updater 240A may modify workflow descriptor 270A's overall workflow status to indicate that the whole workflow is to be aborted, e.g., in addition to or instead of updating just task 272A's status. Other SWAs may detect, e.g., independently and/or asynchronously with respect to SWA 235A, that other tasks such as task 272B of workflow descriptor 270A are appropriate for their parent services, and may perform similar operations as indicated above with respect to task 272A.

In the depicted embodiment, a different WRH 250B may not generate a task list corresponding to a work request submitted by a client 260B via programmatic interfaces 222. Instead, WRH 250B may simply store a summary or high-level description 279 of the work required to fulfill the client's request in workflow descriptor 270B. As shown, SWA 235B comprises a repository listener 236B, a prerequisites analyzer 237B, a back-end request generator 239B, and a status updater 240B, each responsible for similar operations as those discussed above for the corresponding subcomponents of SWA 235A. However, SWA 235B also includes a task generator 242 in the depicted embodiment, which translates the high-level summary 279 into a set of tasks such as 272K. In various embodiments, the logic required to translate a work request into a set of lower-level tasks may be implemented either at the work request handlers, at service workflow agents, or at both the WRHS and the SWAs.

Persistent Change Logs for Workflow Descriptors

Figure 3:
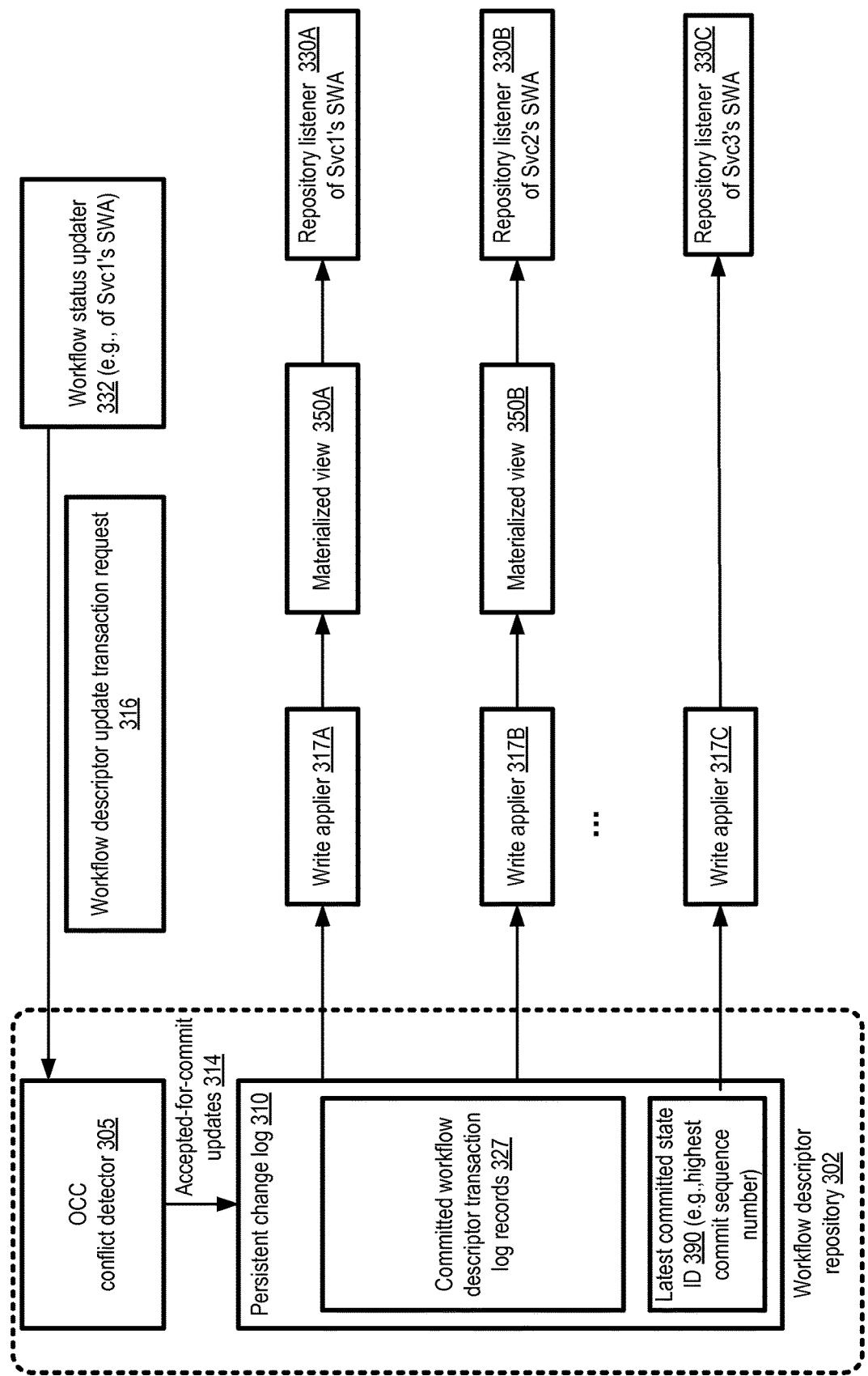
FIG. 3 provides an architectural overview of an example storage system in which modifications to workflow descriptors may be stored in a persistent change log of a repository, according to at least some embodiments.

FIG. 3 provides an architectural overview of an example storage system in which modifications to workflow descriptors may be stored in a persistent change log of a repository, according to at least some embodiments. A persistent change log 310, which may be implemented as a collection of physically distributed nodes arranged in a directed acyclic graph as described below, may be instantiated using a logging service of the provider network in some embodiments. Such a logging service may be used by internal and/or external clients that wish to implement storage objects as sets of log records, with each log record being indicative of one or more changes that have been applied to or at a given data set. In general, the data set may be distributed across many different data stores, such as a NoSQL or non-relational database, a relational database, and so on, each of which may be registered at the logging service for transaction management in the depicted embodiment. In the case of decentralized workflow management across multiple services, a workflow descriptor repository 302 may be implemented as a change log instance 310, and at least some of the services may use materialized views such as 350A and 350B as representations of the workflow descriptors that are relevant to the services.

In the depicted embodiment, logging service clients such as one or more workflow status updaters 332 may construct transaction requests locally, and then submit (or "offer") the transaction requests for approval and commit by the persistent change log 310. In one implementation, for example, a client-side library of the logging service may enable a client to initiate a candidate transaction by issuing the logical equivalent of a "transaction-start" request. Within the candidate transaction, a logging service client may perform some number of reads on a selected set of objects such as workflow descriptors or tasks that are represented in materialized views 350, and locally (e.g., in local memory) perform a proposed set of writes directed at one or more data stores. The client may then submit the candidate transaction by issuing the equivalent of a "transaction-end" request. For example, updater 332 may submit a workflow status update transaction request 316 in the depicted embodiment. The transaction request 316 may be received at an optimistic concurrency control (OCC) conflict detector 305 associated with the persistent change log 310 in the depicted embodiment. In addition to being used by SWA components for workflow status updates, in at least some embodiments the OCC mechanism may also be used for storing the workflow descriptors by work request handlers as well—that is, work request handlers and service workflow agents may both act as clients of the logging service.

In general, in at least some embodiments, a given transaction request such as 316 may indicate at least a write set (one or more proposed writes respectively directed to one or more data objects) and a read set (one or more reads that were directed to one or more data objects prior to the submission of the transaction request), where the read set may or may not overlap with the write set. At least some of the writes indicated in a given transaction request may be dependent on the results of one or more of the reads in some embodiments. For example, a requested transaction 316 may depend upon the contents of task status entries of one or more workflow descriptors stored in materialized view 350A In the depicted embodiment, the conflict detector 305 may determine, based at least in part on the contents of the transaction descriptor 316 and on a set of committed workflow descriptor transaction log records 327 of persistent change log 310, whether the set of data items read in the requested transaction have been updated since they were read by the client that has submitted the requested transaction. A sequence number based technique may be used to determine whether such read-write conflicts exist in at least some embodiments, as described below in further detail. If the conflict detector 305 determines that none of the data that was read during the transaction was overwritten, the requested transaction may be accepted for commit, and such accepted-for-commit updates 314 may be submitted for replication of corresponding log records at the persistent change log. If some of the read data was updated since the corresponding reads occurred (or if a probability that the data was updated is estimated by the conflict detector to be greater than a threshold), the requested transaction 316 may instead be rejected or aborted in the depicted embodiment. This type of approach to concurrency control may be deemed optimistic in that decisions as to whether to proceed with a set of writes of a transaction may be made initially under the optimistic assumption that read-write conflicts are unlikely. As a result, in scenarios in which read-write conflicts are in fact infrequent, higher throughputs and lower response times may be achieved than may be possible if more traditional locking-based techniques are used.

In the case where a transaction is accepted for commit, contents of a committed workflow descriptor transaction log record may be replicated at some number of nodes of a replication DAG associated with the persistent change log 310 (as described below in further detail with respect to FIG. 5) in the depicted embodiment before the commit is considered successful. If the requisite number of replicas is not created, the transaction may be rejected or aborted in the depicted embodiment. The number of replicas required for a commit may vary for different applications or clients. Committed transaction log records may also be referred to herein as "commit records". In some embodiments, the requesting client such as updater 332 may be notified when the requested transaction is committed. In at least one embodiment, the client 332 may be informed when a transaction is rejected, so that, for example, a new transaction request may be generated and submitted for the desired updates.

For each transaction that is committed, in at least some embodiments a commit sequence number (or some other identifier indicative of the committed state of the application) may be generated and stored (e.g., as part of each of the replicas of the committed transaction log record) at the persistent change log 332. Such a commit sequence number may, for example, be implemented as a counter or as a logical timestamp. The commit sequence number may be determined by the conflict detector in some embodiments, or at a different component of the persistent change log (such as a committer node of the replication DAG being used) in other embodiments.

In the depicted embodiment, after a given transaction is committed and its commit record is stored at the persistent change log, the writes of the transaction may be applied or propagated to one or more destinations, such as the materialized views 350. In some implementations, the writes may be pushed in an asynchronous fashion to targeted destinations such as the materialized views 350. In other embodiments, at least some of the writes may be pushed synchronously. In the embodiment shown in FIG. 3, respective write appliers 317 may be used to propagate some or all of the writes. For example, write applier 317A is configured to apply writes that are relevant to a service Svc1 to a materialized view 350A set up on behalf of service Svc1. Similarly, write applier 317B is configured to propagate writes relevant to a different service Svc2 to a different materialized view 350B. In some embodiments, instead of applying writes to a persistent storage object such as a materialized view, a write applier such as 317C may simply notify an entity such as a repository listener 330C of a service workflow agent affiliated with a service such as Svc3 when a write has been committed at the persistent change log. In the depicted embodiment, some repository listeners, such as 330A and 330B affiliated with respective services Svc1 and Svc2, may use pull techniques to determine when updates of interest to their parent services have occurred. Repository listeners 330A and 330B may establish respective cursors on materialized views 350A and 350B in the depicted embodiment, and may utilize the cursors to determine when relevant updates have occurred. In some implementations, the write appliers may comprise subcomponents (e.g., threads or processes) of the persistent change log 310, while in other implementations, write appliers 317 may be implemented as entities external to the persistent change log. In some embodiments, a given write applier 317 may be responsible for propagating writes to more than one destination, or a single destination may receive writes from a plurality of write appliers 317.

In some embodiments, as described below in further detail, a given transaction request 316 may include respective indicators of a read set of the transaction (i.e., information identifying the set of data objects read during the transaction), the write set of the transaction (i.e., information identifying the set of data objects that are to be updated/ written if the transaction is committed), the write payload (i.e., the set of data bytes that are to be stored for each write), and/or a conflict check delimiter (an indication of a subset of the committed transaction log records that should be examined to accept/reject the transaction). Some or all of these constituent elements of a transaction request may be stored within the corresponding commit record, together with the commit sequence number for the transaction. In at least one embodiment, the persistent change log 310 may provide an identifier 390 of the latest committed state of the application (such as the highest commit sequence number generated thus far), e.g., in response to a query from a logging service client such as updater 332 or a repository listener 330A. The write appliers may indicate the commit sequence numbers corresponding to the writes that they propagate in the depicted embodiment.

Figure 4:
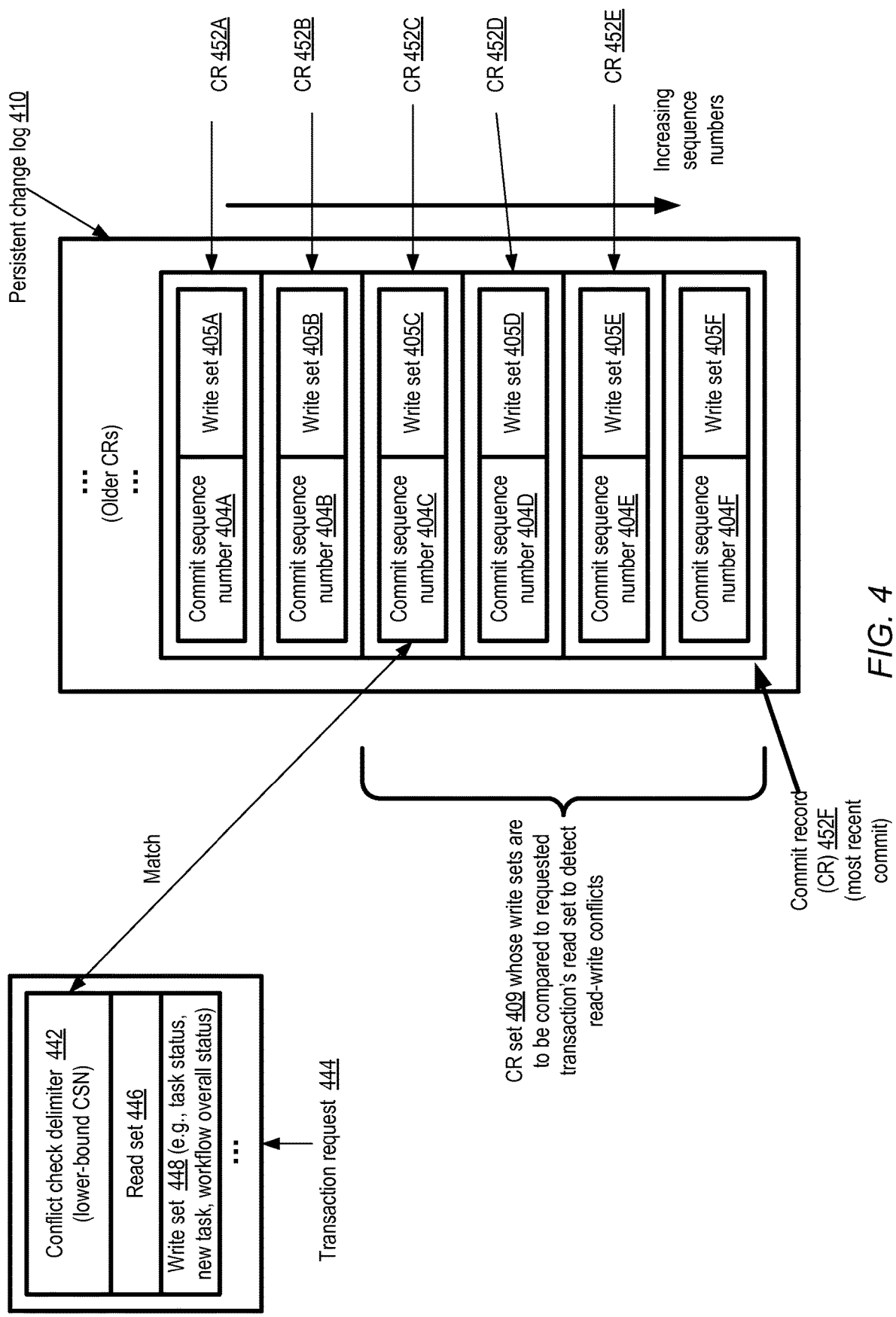
FIG. 4 illustrates an example of read-write conflict detection for transaction requests submitted by a service workflow agent, according to at least some embodiments.

FIG. 4 illustrates an example of read-write conflict detection for transaction requests submitted by a service workflow agent, according to at least some embodiments. In the depicted example, transaction commit records (CRs) 452 stored at persistent change log 410 are shown arranged in order of increasing commit sequence numbers from the top to the bottom of the log. The latest or most recently committed transaction is represented by CR 452F, with commit sequence number (CSN) 404F and write set 405F. Each of CRs 452A, 452B, 452C, 452D and 452E comprise a corresponding CSN 404 (e.g., CSNs 404A-404E respectively) and a corresponding write set 405 (e.g., write sets 405A-405E). In some embodiments, the write sets may include (a) the identifiers or addresses of the objects such as the workflow descriptors being modified as well as (b) the modified data—e.g., task status updates and the like. In one embodiment, write set descriptors indicating the addresses whose data was modified may be stored in the commit records, separately from the modified data itself.

As shown, transaction request 444 includes a conflict check delimiter (or committed state identifier) 442, a read set 446 and a write set 448. The write set 448 may indicate the actual data to be written (e.g., task-level or workflow-level status settings, new tasks, and/or new workflow descriptors), as well as the addresses or identifiers of the objects being written in the depicted embodiment. The read set 446 may include indicators of the objects that were read during the transaction, i.e., the objects on whose values the updates may depend. As in the case of the commit records 452, in some implementations a write set descriptor (indicating the addresses/identifiers of the objects being modified) may be included in one field of transaction request 444, while the data modification (the bytes to be written) may be indicated in a separate field.

The conflict detector of the optimistic concurrency control (OCC) mechanism being used for the workflow descriptor repository may be required to identify a set of CRs of log 410 that are to be checked for conflicts with the read set of the requested transaction. The conflict check delimiter 442 indicates a lower-bound CSN that may be used by the conflict detector to identify the starting CR of set 409 to be examined for read-write conflicts with the requested transaction in the depicted embodiment, as indicated by the arrow labeled "Match". Set 409 may include all the CRs starting with the matching sequence number up to the most recent committed transaction (CR 452F) in some embodiments. If any of the writes indicated by the CR set 409 overlap with any of the reads indicated in the transaction request 444, such a read-write conflict may lead to a rejection of the requested transaction. A variety of mechanisms may be used to check whether such an overlap exists in different embodiments. In one embodiment, for example, one or more hashing-based computations or probes may be used to determine whether a read represented in the read set 446 conflicts with a write indicated in the CR set 409, thereby avoiding a sequential scan of the CR set. In some implementations, a sequential scan of CR set 409 may be used, e.g., if the number of records in the CR set is below a threshold. If none of the writes indicated in CR set 409 overlap with any of the reads of the requested transaction, the transaction may be accepted, since none of the data that were read during the preparation of the transaction request can have changed since they were read. In at least one embodiment, a transaction request may also indicate an upper bound on the sequence numbers of transaction records to be checked for conflicts—e.g., the conflict check delimiter may indicate both a starting point and an ending point within the set of CRs 452.

Figure 5:
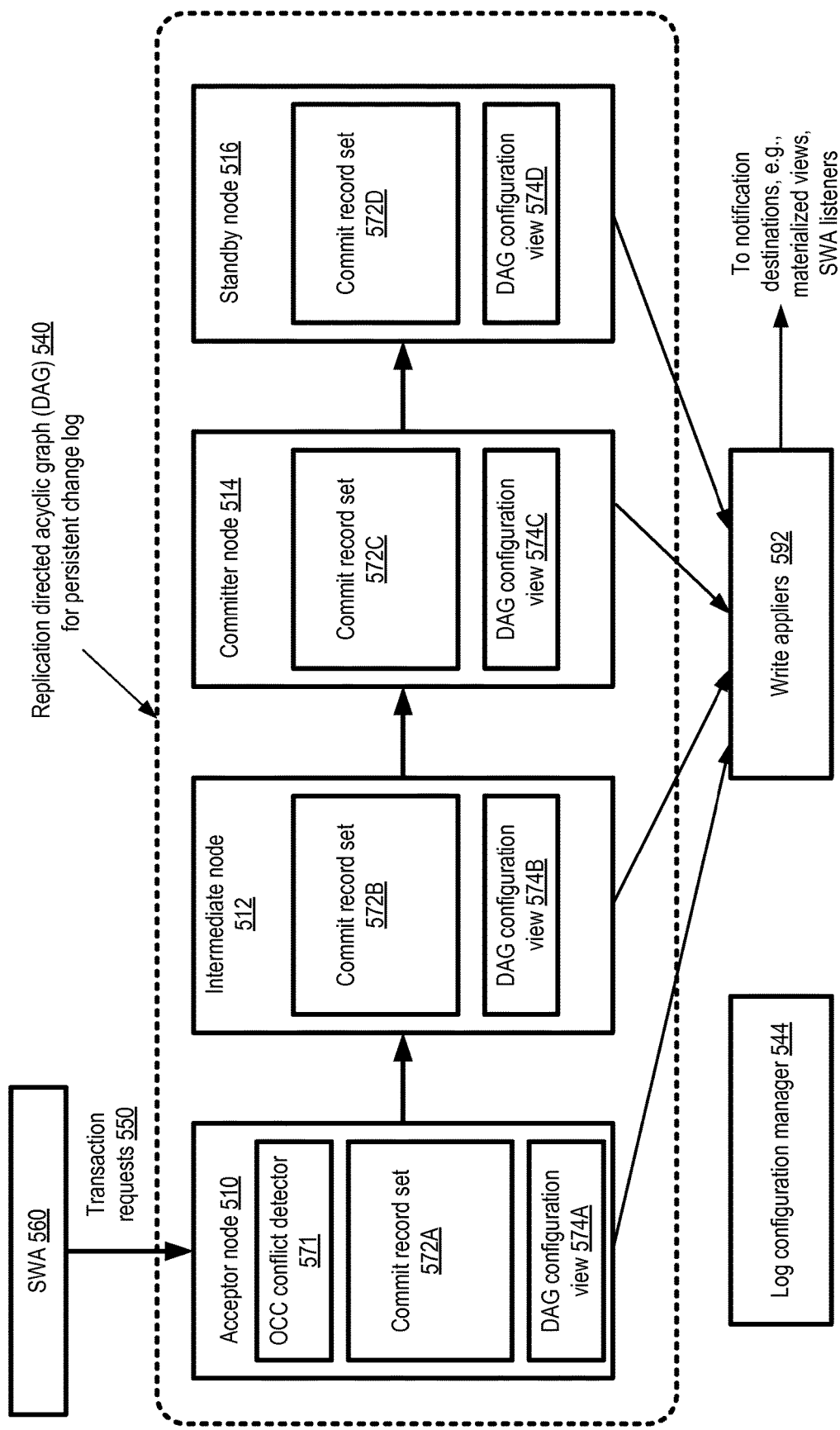
FIG. 5 illustrates an example of a replication directed acyclic graph (DAG) that may be used to implement a persistent change log used for a workflow descriptor repository, according to at least some embodiments.

As mentioned above, the contents of a persistent change log that is used as a workflow descriptor repository may be replicated in at least some embodiments, e.g., to achieve a desired level of data durability for the workflow information. FIG. 5 illustrates an example of a replication directed acyclic graph (DAG) that may be used to implement a persistent change log used for a workflow descriptor repository, according to at least some embodiments. In general, a replication DAG 540 may include one or more acceptor nodes 510 to which transaction requests 550 (such as workflow descriptor update transaction requests) may be submitted, one or more committer nodes 514, zero or more intermediary nodes 512 each positioned along a replication pathway comprising DAG edges leading from an acceptor node to a committer node, and zero or more standby nodes 516 that are configured to quickly take over responsibilities of one of the other types of nodes in the event of a node failure. "Acceptor", "intermediary", "committer", and "standby" may be referred to collectively as the set of roles that a DAG node may assume. In some embodiments, acceptor nodes may also be referred to as "head" nodes of the DAG, and committer nodes may also be referred to as "tail" nodes. In the depicted embodiment, one or more service workflow agents 560 may submit transaction requests 550 (comprising fields similar to those illustrated in FIG. 4's transaction request 444) to acceptor node 510, where a conflict detector 571 may decide whether to accept or reject the transactions. In some implementations, instead of being incorporated within an acceptor node, the conflict detector may be implemented as a separate entity.

In at least some embodiments, each node of a particular replication DAG such as 540 may be responsible for replicating state information of at least a particular application, e.g., by writing the information to a local disk or other similar storage device. In the case of a workflow descriptor repository, for example, as in the depicted embodiment, the state information may comprise the modifications to the workflow descriptor contents. One or more modifications indicated in a transaction request's write set may be stored in the form of a respective commit record at each of the nodes in the depicted embodiment. The commit records may be propagated along a set of edges from an acceptor node to a committer node of the DAG, referred to herein as a replication pathway or a commit pathway. In FIG. 5, the current replication pathway starts at acceptor node 510, and ends at committer node 514 via intermediary node 512. For a given commit record, one replica may be stored in commit record set 572A at the acceptor node 511, another replica may be stored in commit record set 572B at the intermediary node 512, and a third replica may be stored at the commit record set 572C of the committer node 514.

Each commit record propagated within the DAG may include a respective sequence number or a logical timestamp that is indicative of an order in which the corresponding transaction request was processed (e.g., at the acceptor node 510). Sequence numbers may be implemented using any of a variety of techniques in different embodiments—e.g., a simple N-bit counter maintained by the acceptor node 510 or the SWA 560 may be used, or a monotonically increasing logical timestamp value (not necessarily related to a time-of-day clock) may be used. When a particular commit record reaches a committer node, e.g., after a sufficient number of replicas of the commit record have been saved along the replication pathway, the OR may be explicitly or implicitly committed. If for some reason a sufficient number of replicas cannot be created, the commit records may be removed in some embodiments from the nodes (if any) at which they have been replicated thus far. A given modification of a workflow descriptor may be considered complete after the corresponding commit record has been replicated at a committer node of the replication DAG in at least some embodiments. After the modification has been completed, one or more write appliers 592 may propagate the change to a set of destinations that have been configured to receive change notifications, as described earlier. Such destinations may include materialized views and/or service workflow agents, for example. In some implementations, only a subset of the DAG nodes may be read by the appliers 592 in order to propagate committed writes to their destinations. In other embodiments, the appliers may read commit records from any of the DAG nodes to propagate the changes. In at least one embodiment, write appliers may be implemented as respective threads or processes that may run at the same hosts at one or more of the DAG nodes. In other embodiments, write appliers may run on different hosts than the DAG nodes. A commit record may also be transmitted eventually to standby node 516, and a replica of it may be stored in commit record set 572D after it has been committed, so that the standby node 516 is able to replace a failed node of the DAG quickly if and when such a failover becomes necessary.

A log configuration manager (LCM) 544 may be responsible for managing changes to DAG configuration (e.g., when nodes leave the DAG due to failures, or join/re-join the DAG) by propagating configuration-delta messages asynchronously to the DAG nodes in the depicted embodiment. Each configuration-delta message may indicate one or more changes to the DAG configuration that have been accepted or committed at the LCM 544. In some embodiments, each replication node may implement a respective deterministic finite state machine, and the LCM may implement another deterministic finite state machine. The protocol used for managing DAG configuration changes may be designed to maximize the availability or "liveness" of the DAG in various embodiments. For example, the DAG nodes may not need to synchronize their views of the DAG's configuration in at least some embodiments; thus, the protocol used for commit record propagation may work correctly even if some of the nodes along a replication pathway have a different view of the current DAG configuration than other nodes. In FIG. 5, each of the nodes may update its respective DAG configuration view 574 (e.g., 574A, 574B, 574C or 574D) based on the particular sequence of configuration-delta messages it has received from the LCM 544. It may thus be the case, in one simple example scenario, that one node A of a DAG 540 continues to perform its state transition processing responsibilities under the assumption that the DAG consists of nodes A, B, C and D in that order (i.e., with a replication pathway A-to-B-to-C-to-D), while another node D has already been informed as a result of a configuration-delta message that node C has left the DAG, and has therefore updated D's view of the DAG as comprising a changed pathway A-to-B-to-D. The LCM may not need to request the DAG nodes to pause processing of transactions in at least some embodiments, despite the potentially divergent views of the nodes regarding the current DAG configuration. Thus, the types of "stop-the-world" configuration synchronization periods that may be required in some state replication techniques may not be needed when using replication DAGs of the kind described herein to implement durable log instances for workflow descriptor repositories. Although a linear replication pathway is shown in FIG. 5, in general, a replication pathway may include branches at least at some points of time (e.g., during periods when some DAG nodes have received different configuration delta messages than others).

Under most operating conditions, the techniques used for propagating DAG configuration change information may eventually result in a converged consistent view of the DAG's configuration at the various member nodes, while minimizing or eliminating any downtime associated with node failures/exits, node joins or node role changes. In at least some embodiments, the replication DAG's protocols may be especially effective in dealing with false-positive failure detections. For example, in the above example, node D may have been informed by the LCM that node C has failed, even though node C has not actually failed. Thus, workflow descriptor modification transactions may still be processed correctly by C (and by its neighbors B and D) for some time after the false positive failure detection, in the interval before the configuration-delta messages indicating C's exit are received at A, B and D, enabling the publish session to make progress despite the false-positive failure detection. Upon eventually being informed that it has been removed from the DAG, C may indicate to the LCM that it is in fact available for service, and may be allowed to re-join the DAG (e.g., as a standby node or in some other position along the modified replication pathway). In at least some embodiments, the member nodes of a replication DAG may each be implemented as a respective process or thread running at a respective host or hardware server of the provider network. In one embodiment, the different nodes may be located in geographically distributed data centers or availability containers, such that the failure of any one node has a very low probability of affecting any of the other nodes. It is noted that in some embodiments, the commit records used for workflow descriptors may be stored without using the kinds of replication DAGs illustrated in FIG. 5.

Figure 6:
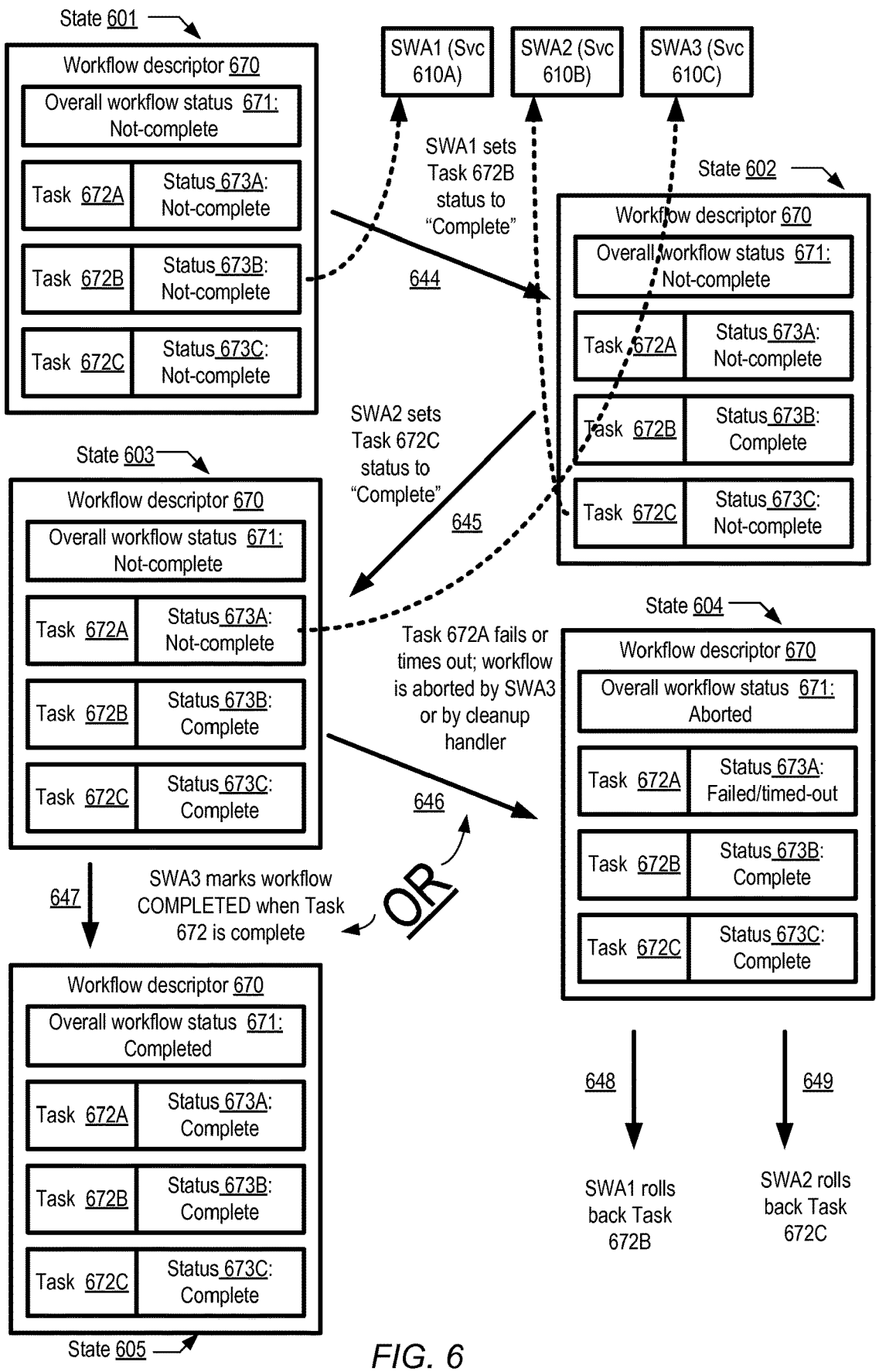
FIG. 6 illustrates examples of modifications that may be made to a workflow descriptor by one or more service workflow agents, according to at least some embodiments.

As indicated in FIG. 1, in which both persistent and non-persistent workflow descriptor repositories are shown, a variety of different approaches may be taken regarding the storage and management of workflow descriptors in different embodiments. Repositories that rely on persistent change logs (as shown in FIG. 4) or replication DAGs (as shown in FIG. 6) may not be used in at least some embodiments. Furthermore, while an optimistic concurrency control mechanism that uses read descriptors and commit sequence numbers as illustrated in FIG. 5 may be employed in one embodiment, other types of concurrency control techniques (either optimistic or non-optimistic) may be used in different embodiments.

Agent-Initiated Changes to Workflow Descriptors

FIG. 6 illustrates examples of modifications that may be made to a workflow descriptor by one or more service workflow agents, according to at least some embodiments. A workflow descriptor 670 comprising respective entries for three tasks 672A, 672B and 672C may be created (e.g., by a work request handler) and stored in a repository. In various embodiments, a log-structured repository of the kind illustrated in FIG. 3, built using underlying replication DAGs of the kind illustrated in FIG. 5 may be used. In its initial state 601, at or shortly after the workflow descriptor 670 is created, the status 673 of each of the tasks (e.g., status 673A, 673B and 673C corresponding to tasks 672A, 672B and 672C respectively) is set to "Not-complete". The overall status of the workflow 671 is also set to "Not-complete". Three service workflow agents SWAT, SWA2 and SWA3, associated with respective services 610A, 610B and 610C may detect that the workflow descriptor 670 has been added to a repository, and may examine the task list to determine whether some or all of the tasks can be performed at their respective parent services. Each of the SWAs may perform their operations independently of, and asynchronously with respect to, each other in the depicted embodiment; in fact, a given SWA need not even be aware of the existence of other SWAs. In some embodiments, depending on the nature and interdependencies of the tasks to be performed, different tasks of the same workflow may be performed in parallel by respective SWAs and their parent services. The order in which tasks are listed in a given task descriptor may be independent of the order in which the tasks are initiated and/or completed in at least some embodiments.

In the example scenario shown in FIG. 6, SWA1 examines the workflow descriptor 670, determines that task 672B can be performed at its parent service 610A, and initiate the corresponding operations (e.g., via communications to one or more back-end servers or nodes of service 610A). Eventually, task 672B is completed, and as indicated by arrow 644, SWA1 may change the status of the task to "Complete" by submitting the appropriate transaction request. In the transaction request, a read set corresponding to state 601 of task 672A may be indicated by SWAT, and a commit sequence number corresponding to that state may be included as a conflict check delimiter. After SWA1's change has been committed, the workflow descriptor 670 may enter state 602.

Similarly, SWA2 may examine the workflow descriptor independently of SWAT, determine that task 672C can be performed at service 610B, and initiate the necessary operations to complete task 672C. If those operations are completed, SWA2 may update the workflow descriptor to state 603, where task 672C's status is set to "Complete", as indicated by arrow 645.

SWA3 may examine the workflow descriptor independently of SWA1 and SWA2 and determine that task 672A can be performed at service 610C. The corresponding operations may be initiated by SWA3. In FIG. 6, two alternatives regarding the fulfillment of task 672A are shown. In the first alternative, as indicated by arrow 647, task 672A succeeds, and the workflow descriptor is updated to state 605. In the second alternative, as indicated by arrow 646, task 672 fails (or does not complete within a timeout period designated for it). If task 672A fails to complete, its status may be set to "Failed", and the workflow as a whole may be aborted by SWA3 in the depicted embodiment. The change of the overall status 671 of the workflow descriptor from "Not-complete" to "Aborted" may trigger SWA1 and SWA2 to undo or roll back the operations corresponding to the other tasks 672B and 672C in the depicted embodiment, as indicated by arrows 648 and 649. If task 672A succeeds SWA3 may change the task-level status 673A to "Complete". In some embodiments, if SWA3 determines that all the other tasks of the workflow descriptor have already been completed, the overall status 671 of the descriptor may also be set to "Complete". In some embodiments, the overall status field 671 may only be modified if the workflow as a whole is to be aborted; that is, overall status 671 need not be set to "Complete". In at least one embodiment, another component of the workflow management system such as a completion checker or a cleanup agent may be responsible for setting the overall status to "Complete", e.g., instead of or in addition to an SWA. It is noted that the order in which changes are applied to the workflow descriptor 670 may differ from that shown in FIG. 6 in various embodiments, and/or a different set of changes may be applied. Furthermore, labels other than "Not-complete", "Complete", "Failed", and/or "Aborted" may be used to indicate various states in some embodiments.

Figure 7:
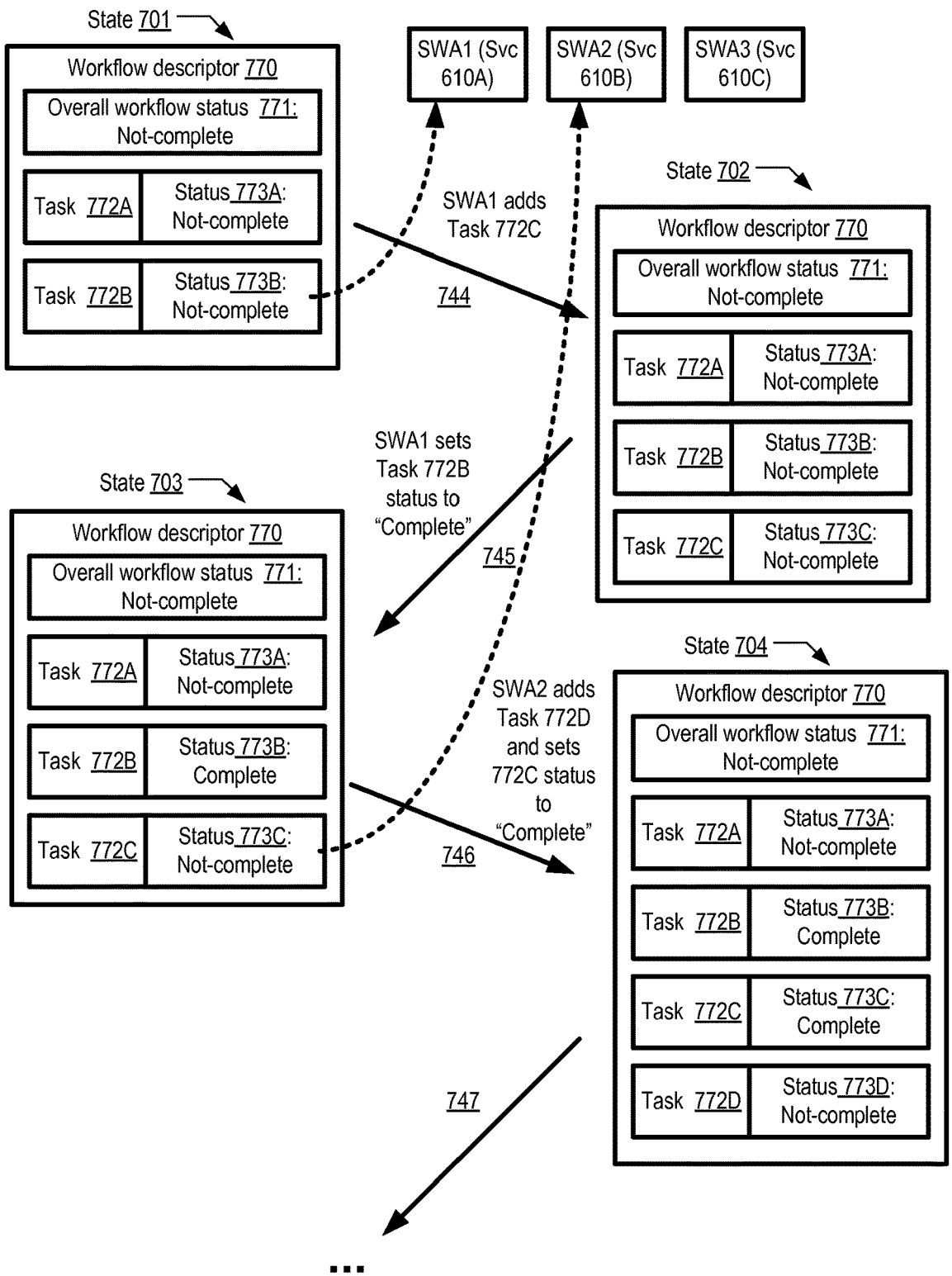
FIG. 7 illustrates examples of insertions of new tasks into a workflow descriptor by one or more service workflow agents, according to at least some embodiments.

In addition to or instead of changing the status fields of various tasks, in at least some embodiments service workflow agents may add or remove tasks from workflow descriptors. FIG. 7 illustrates examples of insertions of new tasks into a workflow descriptor by one or more service workflow agents, according to at least some embodiments. As shown, a workflow descriptor 770 in its initial state 701 may comprise entries for two tasks 772A and 772B in the depicted example scenario. The overall status of the workflow 771 and the status of the individual tasks may each be set to "Not-complete". A service workflow agent SWA1 affiliated with service 610A may examine the workflow descriptor and determine that task 772B can be implemented at service 610A. Accordingly, operations corresponding to task 772B may be initiated by SWA1.

At some point before task 772B is completed, SWA1 may determine that another task 772C should be added to the workflow descriptor 770. A transaction request to insert task 772C may be submitted and approved, as indicated by arrow 744, resulting in state 702 of the workflow descriptor. The additional task 772C may be required for a number of reasons. Some pre-requisites (such as the generation of a resource identifier in accordance with a resource leakage avoidance technique) may have been identified for task 772B, for example. Alternatively, some of the operations performed for task 772B may trigger some follow-on operations, because the work request that led to descriptor 770 may require more work than was initially identified by the entity that generated the workflow descriptor, or for a different reason. The new task 772C may in at least some cases require additional work at a different service than the service whose SWA generates the new task—e.g., SWA1, whose parent service is 610A, may generate task 772C which requires operations of service 610B. In some cases, a new task capable of being performed at the same parent service as that of the task generator (e.g., parent service 610A of task generator SWA1 in the case of task 772C) may be inserted into a workflow descriptor.

In the depicted example scenario, SWA1 may eventually complete task 772B, and submit another transaction request to update task 772B's status to "Complete", as indicated by arrow 745. The workflow descriptor 770 may thereby enter state 703. A different SWA such as SWA2 may detect, independently of the timing of the transition that led to state 703, that task 772C can be performed at SWA2's parent service 610B. Accordingly, operations corresponding to task 772C may be initiated by SWA2. Eventually, SWA2 may determine that another task 772D should be added to the workflow descriptor in the depicted example scenario. In at least some embodiments, a single transaction request that includes (a) the addition of task 772D and (b) the change of task 772'c status to "Complete" may be submitted by SWA2, as indicated by arrow 746. If the transaction request is approved, the workflow descriptor's state may change to state 704 in the depicted example. The addition (or removal) of tasks from workflow descriptors may represent an indirect means of communication among SWAs in various embodiments. Thus, instead of obtaining network addresses for each other and sending messages via network connections directly to one another, SWAs may modify the workflow descriptors in such embodiments under the assumption that any other SWAs likely to be affected by the changes will detect the changes and take the appropriate actions. Additional changes may be applied subsequently to the workflow descriptor 770, as indicated by the arrow 747, until either all the tasks that are included in the descriptor get completed, or the workflow as a whole is aborted. The kinds of changes that workflow descriptor 770 undergoes, and the sequence in which those changes are applied, may differ from the example changes shown in FIG. 7. In some embodiments, for example, SWAs may remove entries for tasks that have been completed (or even non-required tasks that have been abandoned or aborted) from workflow descriptors. In at least one embodiment, an SWA may create a new workflow descriptor instead of or in addition to adding tasks to an existing workflow descriptor.

Update Notifications Mechanisms and Cleanup Operations

Figure 8:
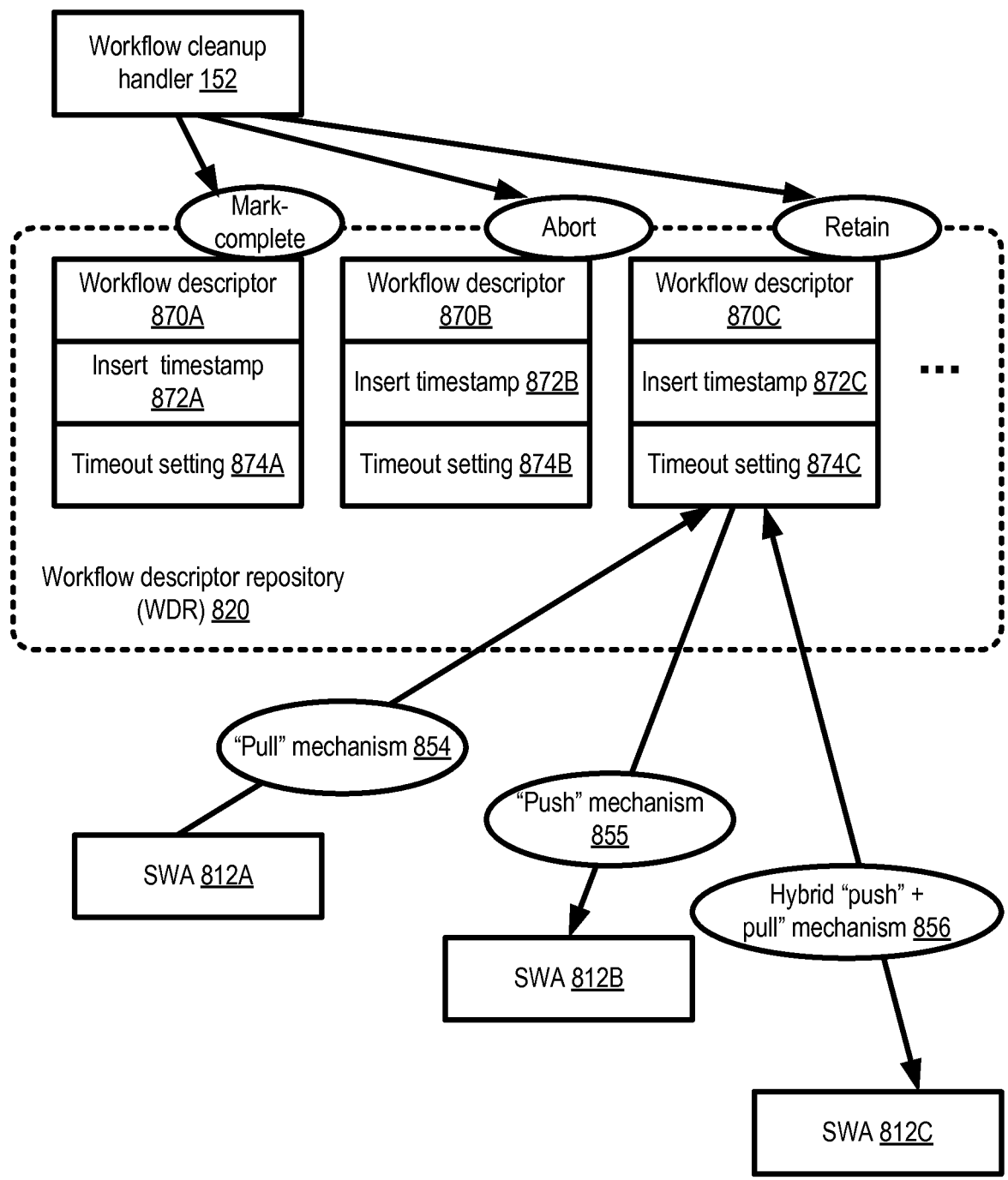
FIG. 8 illustrates examples of update notification mechanisms and cleanup operations that may be implemented with respect to workflow descriptors, according to at least some embodiments.

FIG. 8 illustrates examples of update notification mechanisms and cleanup operations that may be implemented with respect to workflow descriptors, according to at least some embodiments. In the depicted embodiment, a workflow descriptor repository 820 may include numerous workflow descriptors 870, such as 870A, 870B, and 870C. A respective insertion timestamp 872 (e.g., timestamps 872A, 872B or 872C for descriptors 870A, 870B and 870C respectively) and/or a respective timeout setting 874 (e.g., timeout settings 874A, 874B and 874C) may be stored at the repository 820 in the depicted embodiment. The insertion timestamps and/or the timeout settings may be based on wall-clock times in some embodiments, and may be based on a logical clock of the repository that is not necessarily tied to a wall-clock time in other embodiments. In some embodiments, an insert time need not be stored for a given descriptor 870; instead, only a timeout setting may be stored for at least some descriptors. In other embodiments, a separate timeout setting may not be stored for some or all workflow descriptors; instead, a default timeout value (e.g., X seconds after the insertion time) may be applied to various descriptors.

One or more workflow cleanup handlers 152 may be responsible in the depicted embodiment for periodically examining some subset or all of the descriptors of workflow repository 820. In at least one embodiment, the descriptors may be examined in order of increasing insert time 872, e.g., so that older descriptors are examined first. The workflow cleanup handler may take any of a number of different actions with respect to a given workflow handler in some embodiments, such as a "Mark-complete" action, an "Abort" action, or a "Retain" action. If all the tasks of the workflow descriptor have been completed, the cleanup handler may decide to update the overall status of the workflow to "Complete", as indicated by the "Mark-complete" entry for workflow descriptor 870A. If at least one task of a particular workflow descriptor remains incomplete and the descriptor's timeout has expired, the workflow may be aborted, as in the case of descriptor 870B. The change of the state of the workflow to "Aborted" may trigger the rollbacks of one or more completed tasks of the workflow in at least some embodiments as discussed earlier. If some or all the tasks of a descriptor 870 remain incomplete and the corresponding timeout 874 has not yet expired, the descriptor may simply be retained until the workflow cleanup handler's next examination of the repository. In some embodiments, workflow descriptors 870 that are marked as "Complete" or "Abort" may eventually be deleted from the repository. In the case of an aborted descriptor, for example, the workflow cleanup agent may wait to delete the descriptor until all the tasks of the descriptor that were previously marked as "Complete" have been rolled back. The completion of the rolling back of a task may be indicated by the responsible SWA using a status setting such as "Rollback complete" in some embodiments.

With respect to workflow descriptors for which operations have not yet been completed and the timeout has not yet expired, a number of options may be available with respect to the manner in which service workflow agents 812 may learn about state changes. Some SWAs such as 812A may utilize a pull mechanism 854, in which updates to the descriptors are detected at times selected by the SWA and at the initiative of the SWA (e.g., using polling). Using a pull mechanism may enable an SWA to pace its work operations as desired in various embodiments—e.g., an SWA 812A may only decide to check whether any new work for it has arrived in the repository when it has sufficient capacity to do additional work. Other SWAs such as 812B may rely on a push mechanism 855, in which the repository is responsible for notifying the SWA when changes occur. The push mechanism may have the advantage that an SWA need not waste any resources checking for work unnecessarily, e.g., in scenarios in which the timing of the insertion of new workflow descriptor or new tasks is unpredictable. Some SWAs such as 812C may choose a hybrid approach 856 that includes aspects of both push and pull techniques. For example, the SWA 812C may employ a pull mechanism if no notification has been pushed to it from the repository for some period of time, and may otherwise rely on the repository's push mechanism.

Methods for Implementing Decentralized Multi-Service Workflows

Figure 9:
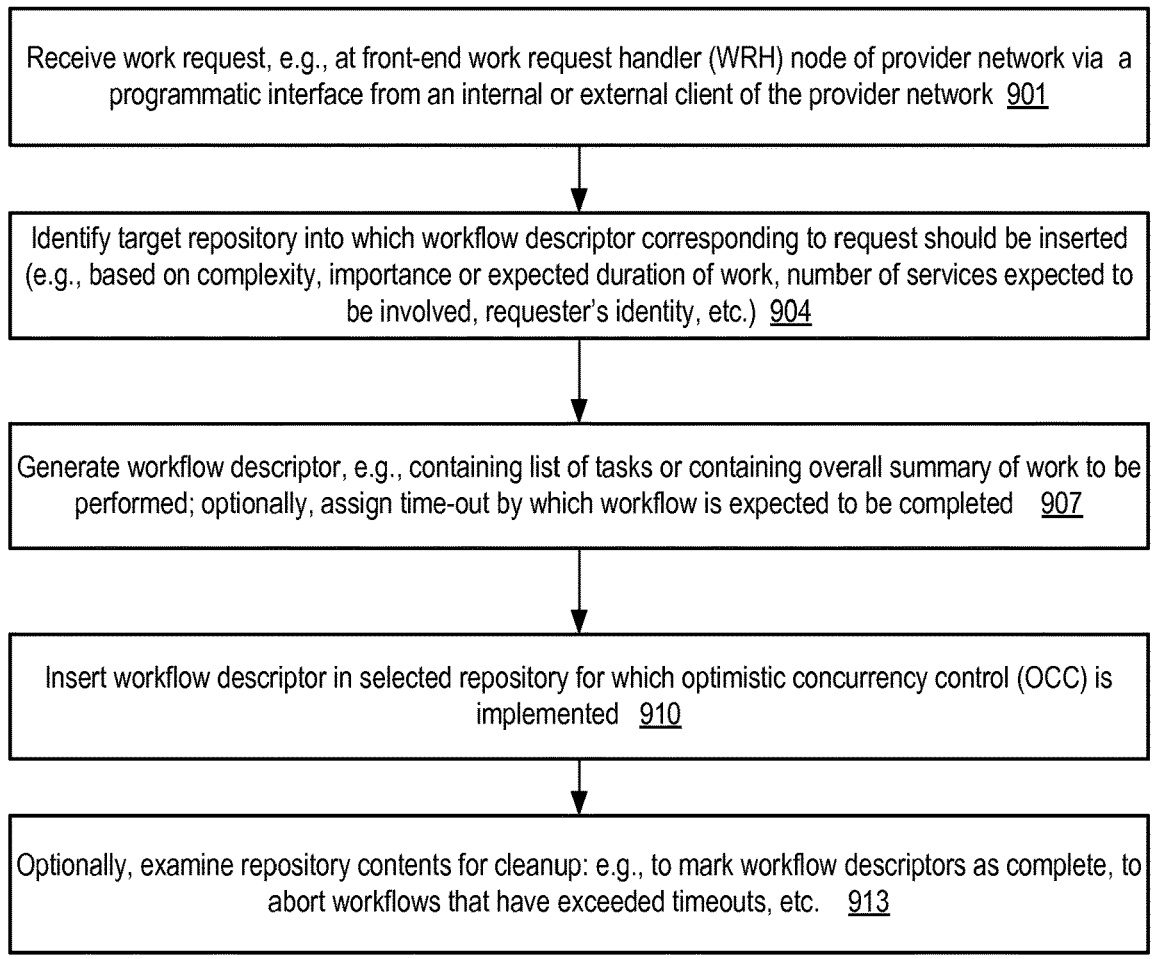
FIG. 9 is a flow diagram illustrating aspects of operations that may be performed to initiate workflows involving one or more services of a provider network, according to at least some embodiments.

FIG. 9 is a flow diagram illustrating aspects of operations that may be performed to initiate workflows involving one or more services of a provider network, according to at least some embodiments. As shown in element 901, a work request handler (WRH) (e.g., a front-end node of a service implemented at a provider network) may receive a work request via a programmatic interface such as an API, a web-based console or form, a command line tool, or a graphical user interface. The work request may originate at a computing device outside the provider network, or at a computing device located within the provider network. Thus, work requests from external clients, internal clients, or both types of clients may be accepted at a given WRH. Some WRHs may be configured specifically for certain types of requests associated with a given provider network service, such as compute instance launch or configuration requests associated with a virtual computing service. Other WRHs may accept a wide variety of request types via several different sets of programmatic interfaces. In some embodiments, one or more fleets of work request handlers may be set up to respond to requests associated with various services of the provider network.

At least for some types of work requests, the WRH may determine that a workflow descriptor is to be created to manage the operations that have to be performed to fulfill the work request. WRHs may therefore also be referred to as workflow initiators herein. As described below in further detail, the workflow descriptor may be used by various service workflow agents to update the respective status of different tasks that are scheduled to complete the requested work. A particular target repository for the workflow descriptor may be selected by the WRH in the depicted embodiment (element 904). In some embodiments, the repository may be determined simply by the nature of the work request—e.g., only one repository may be used for workflow descriptors corresponding to instance launch requests at a given data center. In other embodiments, multiple repositories with different durability, performance and other properties may be available. Various factors may be taken into account when selecting a target repository in some embodiments, such as the complexity, relative importance or expected duration of the work to be performed, the number of services expected to be involved in responding to the wok request, the identity of the entity from which the work request was received, etc. For example, for some work requests which can be fulfilled very quickly or only involve a small number of services, a repository in the non-persistent memory of a selected host may be used. For other work requests, a persistent repository implemented using multiple replicas of workflow descriptor contents at different geographically distributed nodes, such as the replication DAG nodes discussed earlier, may be used.

A workflow descriptor may be generated for the work request by the WRH (element 907) in the depicted embodiment. In some embodiments, the workflow descriptor may include a collection of entries indicating respective tasks that are expected to be performed to respond to the work request. In other embodiments, the WRH may simply store a high-level summary or overview of the work to be performed in the work descriptor, and the summary may be translated into lower-level tasks by other entities such as the service workflow agents as discussed in the context of FIG. 2 above. In at least some embodiments, the WRH may not need to be aware of the division of responsibilities for the work to be performed—e.g., the WRH may not need to know that resources of service S1 may be used for some of the tasks to be performed while resources of a different service S2 may be used for other tasks. Even in scenarios in which a WRH breaks down the work required into a set of tasks, in at least some embodiments the WRH may not need to be concerned about possible dependencies among the tasks, and/or the order in which the tasks need to be completed. In some embodiments the WRH may assign a timeout to the workflow descriptor, indicating a deadline by which the tasks needed to respond to the work request are to be completed. The workflow descriptor may be inserted into the selected repository (element 910). In at least some embodiments, an optimistic concurrency control (OCC) mechanism may be used for managing updates to the repository. In accordance with the OCC mechanism, transaction requests of the kind illustrated in FIG. 4 may be submitted to a conflict detector of the repository, and a decision as to whether to accept or reject a transaction may be made by the conflict detector using a (possibly empty) read set and other metadata indicated in the transaction request. If a transaction is accepted for a persistent repository implemented as a replication DAG, the corresponding changes (e.g., a representation of the new workflow descriptor) may be replicated at a plurality of nodes of the DAG.

After the workflow descriptor has been inserted into the appropriate repository, in at least some embodiments the WRH may not have to perform any additional operations pertaining to the received work request. Instead, as discussed earlier, one or more service workflow agents affiliated with various network-accessible services may determine that the repository has been modified, examine the newly inserted workflow request, schedule the appropriate operations at their respective services after ensuring that any pre-requisite conditions for the operations have been met, and update the workflow descriptor within the repository as needed. In one embodiment, at least some of the workflow descriptors in the repository may be examined for cleanup purposes (element 913), e.g., either by dedicated cleanup handlers or by the WRHs themselves. Such cleanup operations may include, for example, identifying workflow descriptors whose timeouts have expired before all the required operations of the workflows have been completed, and aborting such workflows in some embodiments. When a workflow descriptor is aborted due to a timeout (or due to other reasons such as the failure of a task), and one or more tasks of the workflow were already underway or complete, such in-progress or completed tasks may be rolled back or undone. In some implementations, if a workflow descriptor has no outstanding un-completed tasks remaining, it may be marked as complete or removed from the repository.

Figure 10A:
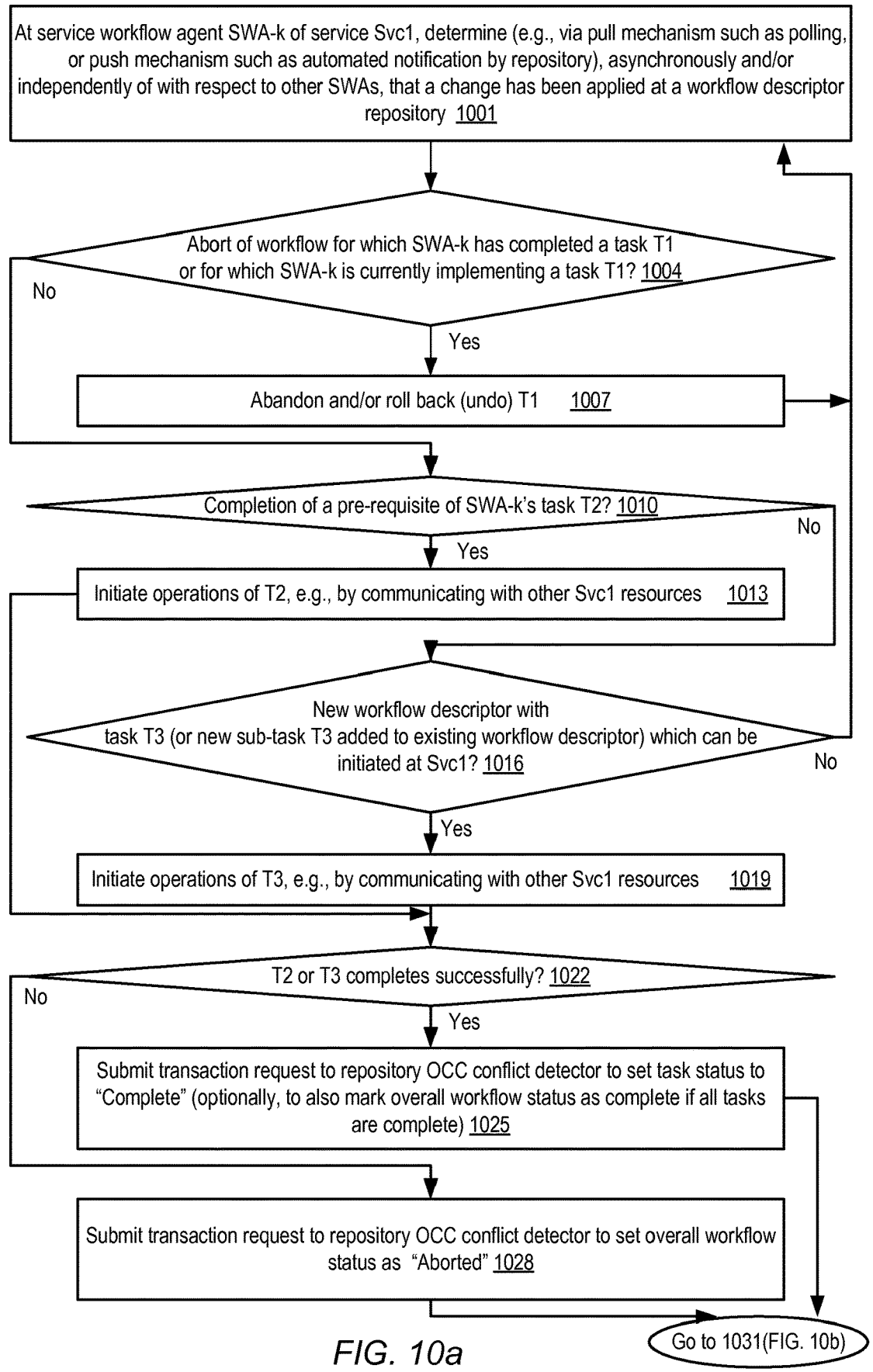
FIGS. 10a and 10b collectively illustrate aspects of operations that may be performed by a service workflow agent, according to at least some embodiments.
Figure 10B:
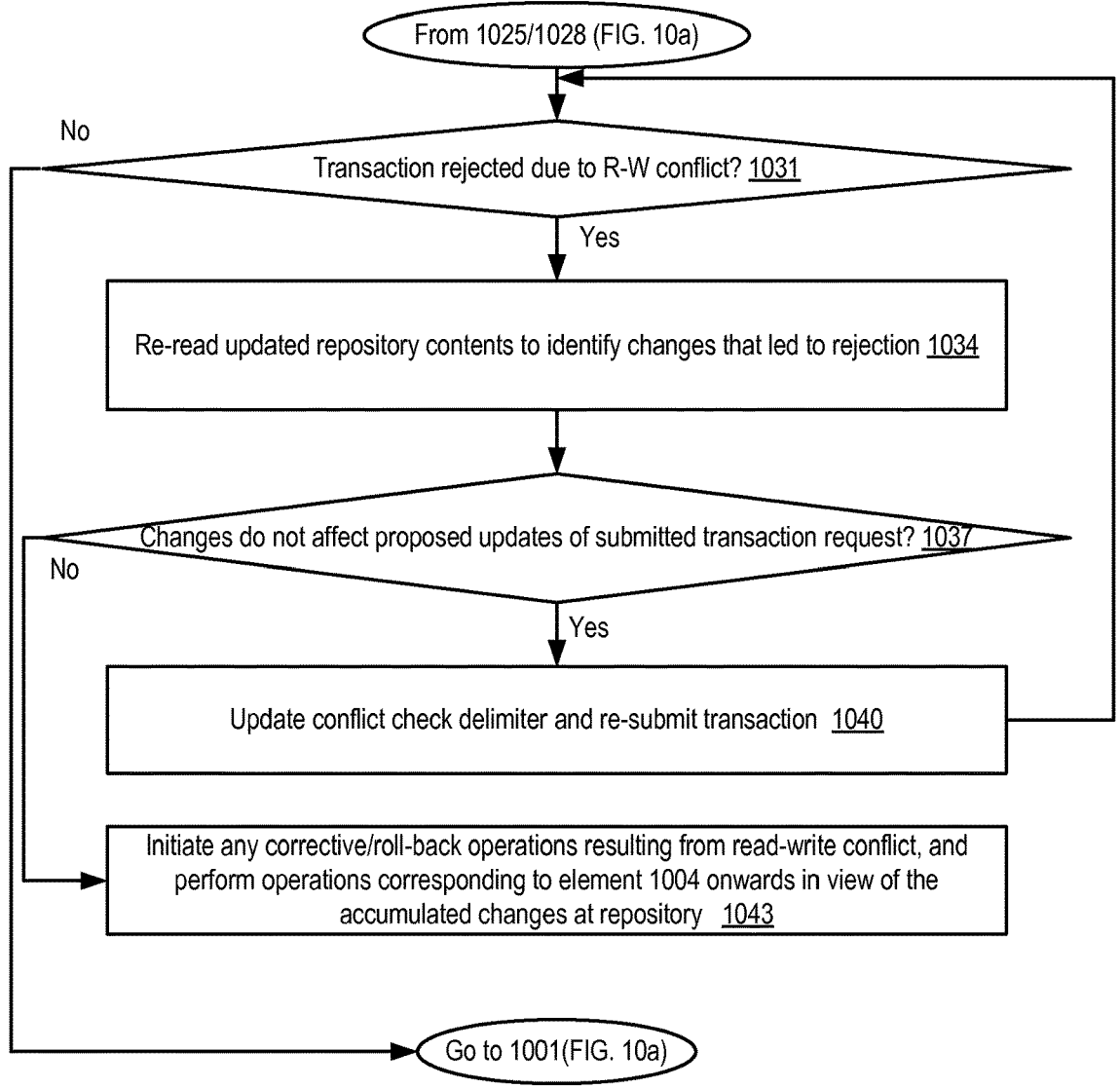

FIGS. 10a and 10b collectively illustrate aspects of operations that may be performed by a service workflow agent, according to at least some embodiments. As shown in element 1001, a service workflow agent SWA-k of a network-accessible service Svc1 may determine that a change has been applied or committed at a workflow descriptor repository. In various embodiments SWA-k may be implemented as one or more process or threads of execution running on a host assigned to Svc1. In some embodiments, several different services implemented at a provider network may set up respective fleets of one or more SWAs to help manage the service's participation in the work required to respond to client requests. In at least one embodiment, at least some SWAs of a provider network may perform their respective operations independently of, and/or asynchronously with respect to other SWAs of the same service or of other services. The SWAs may use a variety of mechanisms to detect or ascertain changes at a repository in different embodiments—e.g., some SWAs may use a "pull" mechanism to query or poll the repository at times selected by the SWAs, while other SWAs may register to be notified automatically via a push mechanism implemented at the repository. Combinations of pull and push techniques may be used by some SWAs. In some embodiments, a given SWA may only be configured to respond to changes at one repository, while in other embodiments a given SWA may respond to changes detected at several different repositories.

The change that was applied at the repository and detected by SWA-k may represent any of a variety of events. For example, the change could include an abort of a workflow for which SWA-k has already completed a task T1 (e.g., by requesting the appropriate operations be performed by other components of Svc1), or for which SWA-k is in the process of implementing a task T1. If SWA-k determines that the change comprises such an abort (as indicated in element 1004), T1 may be abandoned and/or rolled back (element 1007). In some embodiments, after undoing T1, SWA-k may update the status of T1 within T1's parent workflow descriptor, e.g., by setting the T1 status entry in the workflow to "Rollback complete" or a logical equivalent thereof.

In another scenario, prior to detecting the change at the repository, SWA-k may have deferred a task T2 because a pre-requisite for T2 had not yet been completed. Such a prerequisite may, for example, include the generation of an identifier for a resource that is to be allocated as part of T2, in accordance with a resource leakage prevention technique of the kind discussed earlier. Such pre-requisite identification may be performed by each SWA (e.g., using a prerequisite analyzer of the kind illustrated in FIG. 2) before it schedules the operations of any given task in some embodiments. If the change applied to the repository represents a successful completion of the pre-requisite task for such a task T2 (as detected in element 1010), T2 may be initiated by SWA-k (element 1013), e.g., by sending one or more requests for T2's operations to other Svc1 resources or components.

In a third scenario, the update to the repository may indicate new work that can be performed by or at Svc1—e.g., a new workflow descriptor with a task T3 appropriate for Svc1 may have been stored in the repository, or a new task T3 appropriate for Svc1 may have been inserted into an existing workflow descriptor. If such a new task or descriptor has been created as part of the repository update (as detected in element 1016) and has no outstanding pre-requisites, SWA-k may initiate the corresponding operations (element 1019), e.g., by communicating with one or more other components or resources of Svc1. If there are outstanding pre-requisite tasks or operations that prevent the newly-identified task from being initiated, the task T3 may be deferred. In a fourth possible scenario, represented by the negative outcome from element 1016, the change applied at the repository may result neither in an abort of a workflow, nor in new operations required from SWA-k, in which case SWA-k may simply resume waiting for the next change at the repository (e.g., operations corresponding to element 1001 onwards may be repeated for the next change applied to the repository).

If the operations corresponding to a task T2 (which may have been scheduled after its pre-requisites were completed) or T3 (which may have been scheduled because it had no prerequisites) eventually complete or succeed, as detected in element 102, SWA-k may submit a transaction request to the optimistic concurrency control (OCC) conflict detector of the repository to update the task's status in the repository to "Complete" (element 1025). In some embodiments, if the task that was completed happened to be the last incomplete task remaining in its workflow descriptor (i.e., if all the tasks of the workflow descriptor have been successfully completed), the overall workflow status field of the descriptor may also be set to "Complete" within the transaction request. In contrast, if the operations of T2 or T3 failed to complete, a transaction request to mark the workflow as a whole as "Aborted" may be generated and transmitted to the OCC conflict detector (element 1028). In various embodiments, the transaction request may include an indication of a conflict check delimiter and/or a read set, as described above in the context of FIG. 4, which can be used by the conflict detector to accept or reject the transaction request.

The submitted transaction request may be accepted or rejected in accordance with the OCC mechanism and logic being used. If the request is accepted (as detected in element 1031 of FIG. 10*b*), SWA-k may simply resume its operations to detect subsequent changes to the repository; that is, no further operations pertaining to the currently-examined change at the repository may be needed. If, in contrast, the transaction request is rejected, e.g., due to a read-write conflict (as also indicated in element 1031), in at least some embodiments SWA-k may read the contents of the repository that have changed since it examined the read set that was indicated in the rejected transaction request (element 1034). Changes to at least a portion of the read set may have led to the rejection of the transaction request, so SWA-k may determine whether those changes affect the contents of the transaction request. If the read set changes do not affect the updates indicated in the transaction request (as determined in element 1037), the conflict check delimiter included in the transaction request may be updated to reflect the latest state of the repository that was read by SWA-k to prepare the transaction request. The updated transaction request may then be re-submitted (element 1040) to the OCC conflict detector, and depending in the decision made by the OCC conflict detector, the operations corresponding to elements 1031 onwards may be repeated. If the changes that led to the rejection of the transaction do impact the updates that were submitted in the transaction request (as also detected in element 1037), SWA-k may have to initiate some rollback operations in some cases, e.g., for operations that have been invalidated as a result of changes to the read set. In effect, in such a scenario the rejection of the transaction may be treated as the equivalent of a detection of one or more accumulated changes at the repository, and SWA-k may therefore repeat the operations corresponding to element 1004 onwards in view of the accumulated changes.

It is noted that in various embodiments, operations other than those illustrated in the flow diagrams of FIGS. 9, 10*a* and 10*b* may be used to implement at least some of the techniques for supporting decentralized workflows. Some of the operations shown may not be implemented in some embodiments, may be implemented in a different order than illustrated in FIG. 9, FIG. 10*a* or FIG. 10*b*, or in parallel rather than sequentially.

Use Cases

The techniques described above, of using shared workflow descriptors as status indicators for various tasks of complex workflows that may require the participation of resources of multiple services, may be useful in a variety of environments. As the sophistication and complexity of the capabilities supported by provide networks has increased, the amount of work that has to be done behind the scenes to fulfill what may appear to be simple work requests (such as instance launch requests) has increased dramatically. Instead of trying to manage the complex set of interdependent operations required for a work request from a central entity using two-phase commit and other similar protocols, using a workflow descriptor that is independently analyzable and updatable by numerous service workflow agents that can start off respective subsets of the operations may lead to a substantial simplification of the implementation. Delegating pre-requisite dependency analysis to the service workflow agents may lead to better scheduling of tasks than may have been possible using a centralized scheduler. The use of optimistic concurrency control to coordinate changes to the workflow descriptors may reduce the overheads that may have been encountered if locking schemes were used instead. From a staffing and software development perspective, using the decentralized approach may make it much easier to schedule and implement needed improvements at all the different services involved in responding to various categories of work requests.

Illustrative Computer System

Figure 11:
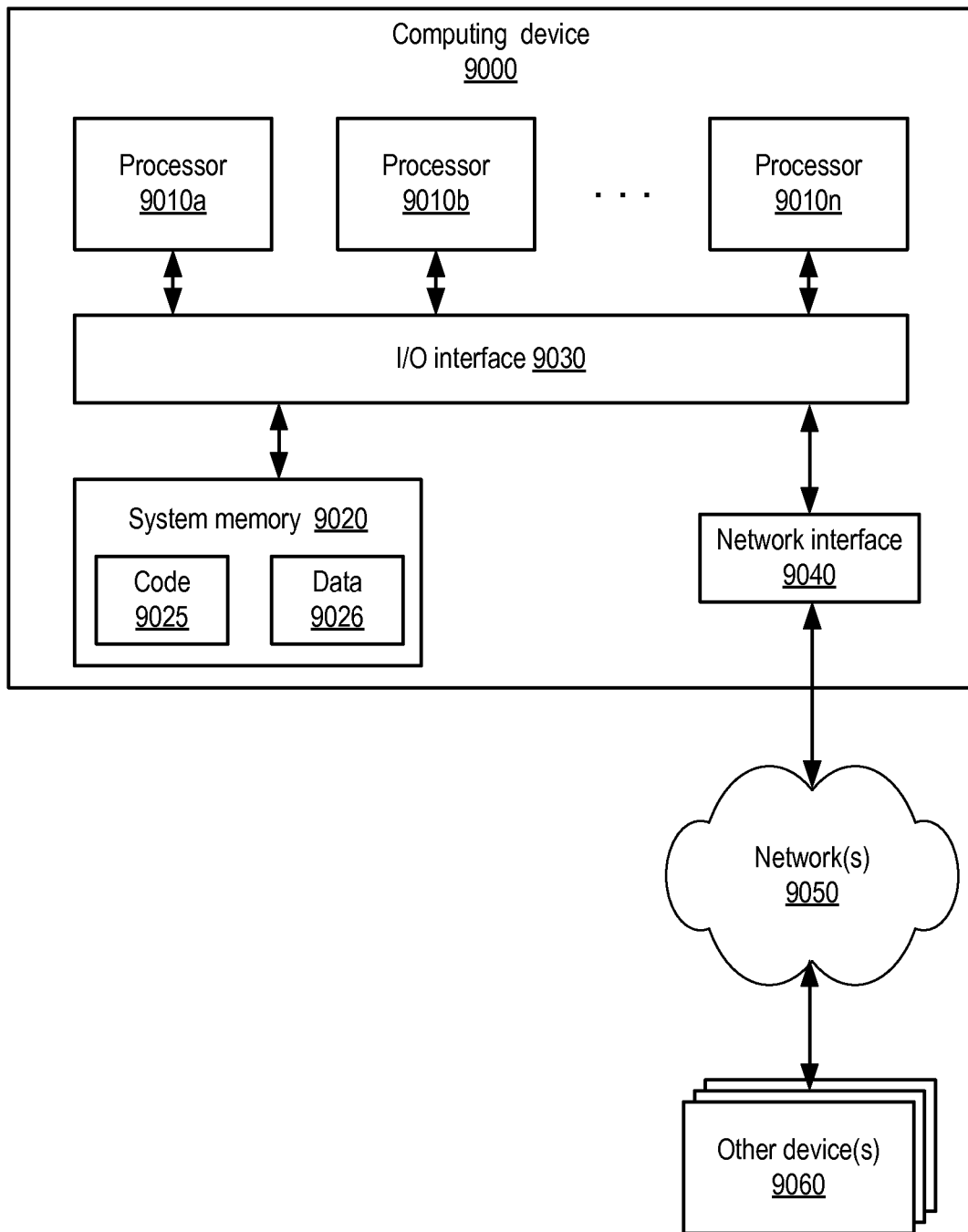
FIG. 11 is a block diagram illustrating an example computing device that may be used in at least some embodiments.

In at least some embodiments, a server that implements one or more of the techniques described above for supporting decentralized multi-service workflows may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10*b*, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10*b* for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:
1. A system, comprising:
  a plurality of service agents of a provider network, including a first service agent of a first network-accessible service implemented at the provider network and a second service agent of a second network-accessible service implemented at the provider network; and
  a work request handler implemented by one or more processors and configured to:
    generate a workflow descriptor indicative of a plurality of tasks to be performed to respond to a work request, wherein the plurality of tasks includes at least a first task to be performed at the first network-accessible service and a second task to be performed at the second network-accessible service, wherein the first task includes an allocation of a first resource; and insert the workflow descriptor in a repository accessible by the first service agent and the second service agent; and wherein the first service agent is implemented by one or more processors and is configured to:

in response to detecting that the workflow descriptor has been modified based on a modification operation performed at the repository, examine the workflow descriptor;

initiate an attempt to implement the first task of the workflow descriptor using a particular resource leakage prevention technique to allocate the first resource;

responsive to the attempt to implement the first task, send a first transaction request to a conflict detector configured to implement an optimistic concurrency control mechanism at the repository to determine whether to commit the first task based on a first read set of data objects, wherein the first task comprises one or more reads of the first read set of data objects; and update, in accordance with the optimistic concurrency control mechanism determining whether to commit the first task, the workflow descriptor to indicate a status of the first task; and wherein the second service agent is asynchronous with respect to the first service agent and implemented by one or more processors and configured to:

in response to detecting that the workflow descriptor has been modified based on the modification operation performed at the repository, examine the workflow descriptor;

initiate an attempt to implement the second task of the workflow descriptor;

responsive to the attempt to implement the second task, send a second transaction request to the conflict detector to determine whether to commit the second task based on a second read set of data objects, wherein the second task comprises one or more reads of the second read set of data objects; and update, in accordance with the optimistic concurrency control mechanism determining whether to commit the second task, the workflow descriptor to indicate a status of the second task.

2. The system as recited in claim 1, wherein the particular resource leakage prevention technique comprises obtaining, by the first service agent prior to requesting an allocation of the first resource, an identifier generated for the first resource.

3. The system as recited in claim 1, wherein the work request comprises a request to launch a compute instance, and wherein a particular network-accessible service of the first and second network-accessible services comprises: (a) a storage volume allocation service, (b) a network interface service, (c) a placement service, (d) a machine image service, or (e) a security service.

4. The system as recited in claim 1, wherein the repository comprises an instance of a persistent log comprising a plurality of replication nodes arranged in a directed acyclic graph (DAG).

5. The system as recited in claim 1, wherein the plurality of tasks includes a third task to be performed at a third network-accessible service of the provider network, wherein the plurality of service agents comprises a third service agent of the third network-accessible service, wherein to update the workflow descriptor, the first service agent stores an indication that the first task has been completed, and wherein the third service agent is implemented by one or more processors and configured to:

initiate an attempt to implement the third task; and update, subsequent to a failure of the third task, the workflow descriptor at the repository to indicate that the plurality of tasks are to be abandoned;

and wherein the first service agent is configured to:

in response to re-examining the workflow descriptor subsequent to the update by the third service agent, initiate a rollback of the first task.

6. The system as recited in claim 1, wherein the work request handler is configured to:

store, at the repository, a different workflow descriptor indicative of a plurality of tasks to be performed to respond to a different work request, wherein the plurality of tasks includes at least a third task to be performed at the first network-accessible service and a fourth task to be performed at a second network-accessible service of the provider network;

and wherein the first service agent is configured to:

in response to examining the different workflow descriptor, determine, that (a) a completion of the fourth task is a prerequisite for an initiation of the third task and (b) the fourth task has not yet been completed; and defer an attempt to implement the third task.

7. A method, comprising:

storing, at a repository by a workflow initiator of a provider network, a workflow descriptor indicative of a plurality of tasks to be performed to respond to a work request, wherein the plurality of tasks includes at least a first task to be performed at a first network-accessible service of the provider network and a second task to be performed at a second network-accessible service of the provider network;

in response to examining the workflow descriptor stored at the repository, initiating, by a first service agent of the first network-accessible service, an attempt to implement the first task;

responsive to the attempt to implement the first task, send a first transaction request to a conflict detector configured to implement an optimistic concurrency control mechanism implemented at the particular repository to determine whether to commit the first task based on a first read set of data objects, wherein the first task comprises one or more reads of the first read set of data objects;

updating, by the first service agent, the workflow descriptor at the repository to indicate a status of the first task based on the optimistic concurrency control mechanism determining whether to commit the first task;

in response to examining the workflow descriptor stored at the repository, initiating, by a second service agent of the second network-accessible service that is asynchronous with respect to the first service agent, an attempt to implement the second task;

responsive to the attempt to implement the second task, send a second transaction request to the conflict detector to determine whether to commit the second task based on a second read set of data objects, wherein the second task comprises one or more reads of the second read set of data objects; and updating, by the second service agent, the workflow descriptor at the repository to indicate a status of the second task based on the optimistic concurrency control mechanism determining whether to commit the second task.

8. The method as recited in claim 7, wherein the optimistic concurrency control mechanism is configured to:
examine the first read set of data objects indicated in the first transaction request, wherein the first read set of data objects identify data objects read during the attempt to implement the first task; and
determine whether the first read set of data objects has changed since a last committed state known to the first service agent when the first transaction request is generated; and
in response to a determination that the first read set of data objects has changed since the last committed state, indicate to the first service agent to reject committing the first task.

9. The method as recited in claim 7, wherein the repository comprises an instance of a persistent log comprising a plurality of replication nodes arranged in a directed acyclic graph (DAG), and wherein the repository is implemented within a volatile memory of a server of the provider network.

10. The method as recited in claim 7, wherein the modification operation comprises inserting the workflow descriptor, modifying the workflow descriptor, updating the workflow descriptor, or any combination thereof.

11. The method as recited in claim 7, wherein the plurality of tasks includes a third task to be implemented at a third network-accessible service of the provider network, wherein said updating the workflow descriptor by the first service agent comprises storing an indication that the first task has been completed, further comprising:
in response to examining the workflow descriptor stored at the repository, initiating, by a third service agent of the third network-accessible service, an attempt to implement the third task;
updating, by the third service agent subsequent to a failure of the third task, the workflow descriptor at the repository to indicate that the plurality of tasks are to be abandoned;
in response to re-examining, by the first service agent, the workflow descriptor subsequent to said updating by the third service agent, initiating a rollback of the first task by the first service agent.

12. The method as recited in claim 7, further comprising:
storing, at the repository by the workflow initiator, a different workflow descriptor indicative of a plurality of tasks to be performed to respond to a different work request, wherein the plurality of tasks includes at least a third task to be performed at the first network-accessible service and a fourth task to be performed at a second network-accessible service of the provider network;
in response to examining the different workflow descriptor stored at the repository, determining, by the first service agent that (a) a completion of the fourth task is a prerequisite for an initiation of the third task and (b) the fourth task has not yet been completed; and
deferring, by the first service agent, an attempt to implement the third task.

13. The method as recited in claim 12, further comprising:
updating, by the second service agent, the different workflow descriptor to indicate that the fourth task has been completed;
determining, by the first service agent subsequent to said deferring, that the different workflow descriptor has been modified;
in response to re-examining the different workflow descriptor stored at the repository,
determining, by the first service agent, that the fourth task has been completed; and
initiating, by the first service agent, an attempt to implement the third task.

14. The method as recited in claim 12, further comprising:
updating, by the second service agent, the different workflow descriptor to indicate that the fourth task has failed;
determining, by the first service agent subsequent to said deferring, that the different workflow descriptor has been modified;
in response to re-examining the different workflow descriptor stored at the repository,
determining, by the first service agent, that the fourth task has failed; and
abandoning, by the first service agent, the third task.

15. The method as recited in claim 7, further comprising:
determining, by a workflow cleanup handler, that (a) a timeout associated with a different workflow descriptor stored at the repository has expired and (b) at least one task of the different workflow descriptor has not been completed and
initiating an abort of one or more tasks indicated in the different workflow descriptor.

16. The method as recited in claim 7, further comprising:
adding, by the first service agent to the workflow descriptor, an indication of a third task;
determining, by a third service agent of a third network-accessible service, that the indication of the third task has been added to the workflow descriptor; and
initiating, by the third service agent, an attempt to implement the third task.

17. The method as recited in claim 7, wherein the work request is received from a particular client, further comprising:
determining, by a workflow completion checker, that all tasks indicated in the workflow descriptor have been completed; and
providing, to the particular client, an indication that the work request has been fulfilled.

18. A non-transitory computer-accessible storage medium storing program instructions that when executed on one or more processors cause the one or more processors to implement a first service agent configured to:
identify one or more repositories, including a particular repository, in which workflow descriptors indicative of tasks to be performed at a particular network-accessible service are stored; and
in response to determining, asynchronously with respect to a second service agent, that a modification operation to a particular workflow descriptor has been performed at the particular repository:
examine the particular workflow descriptor stored in the repository;
initiate an attempt to implement a first task indicated in the particular workflow descriptor;
responsive to the attempt to implement the first task, send a first transaction request to a conflict detector configured to implement an optimistic concurrency control mechanism implemented at the particular repository to determine whether to commit the first task based on a first read set of data objects, wherein the first task comprises one or more reads of the first read set of data objects, wherein the conflict detector is configured to asynchronously receive a second transaction request from the second service agent; and update, in accordance with the optimistic concurrency control mechanism determining whether to commit the first task, the workflow descriptor to indicate a status of the first task.

19. The non-transitory computer-accessible storage medium as recited in claim 18, wherein the particular workflow descriptor is stored in the repository in response to a work request comprises a request to launch a compute instance, and wherein the particular network-accessible service comprises one of: (a) a storage volume allocation service, (b) a network interface service, (c) a placement service, (d) a machine image service, or (e) a security service.

20. The non-transitory computer-accessible storage medium as recited in claim 18, wherein the repository comprises an instance of a persistent log comprising a plurality of replication nodes arranged in a directed acyclic graph (DAG).

21. The non-transitory computer-accessible storage medium as recited in claim 18, wherein the workflow descriptor indicates a plurality of tasks including a second task, wherein the instructions further cause the one or more processors to:

re-examine the workflow descriptor subsequent to initiating the attempt to perform the first task;

determine, from the workflow descriptor, that the second task has failed; and initiate a rollback of the first task.

* * * * *